United States Patent [19]

Engeler

[11] Patent Number: 5,146,542
[45] Date of Patent: Sep. 8, 1992

[54] NEURAL NET USING CAPACITIVE STRUCTURES CONNECTING OUTPUT LINES AND DIFFERENTIALLY DRIVEN INPUT LINE PAIRS

[75] Inventor: William E. Engeler, Scotia, N.Y.

[73] Assignee: General Electric Company, Schenectady, N.Y.

[21] Appl. No.: 366,839

[22] Filed: Jun. 15, 1989

[51] Int. Cl.[5] .................. G06G 7/12; G06G 7/184; G06J 1/00

[52] U.S. Cl. .................................. 395/24; 307/201; 364/602; 364/807

[58] Field of Search ............... 364/807, 819, 825, 826, 364/827, 602, 604, 513; 307/201

[56] References Cited

U.S. PATENT DOCUMENTS

| | | | |
|---|---|---|---|
| 3,890,635 | 6/1975 | Engeler | 357/14 |
| 3,950,733 | 4/1976 | Cooper et al. | 364/200 |
| 3,969,636 | 7/1976 | Baertsch et al. | 307/304 X |
| 4,156,284 | 5/1979 | Engeler | 364/862 |
| 4,288,858 | 9/1981 | Merola et al. | 364/826 |
| 4,903,226 | 2/1990 | Tsividis | 364/807 |

OTHER PUBLICATIONS

Soclof, S., *Analog Integrated Circuits*, pub. by Prentice-Hall, Inc., Englewood Cliffs, N.J. 07632, 1985, pp. 306, 333.

Hosticka, B. et al., "MOS Sampled Data Recursive Filters Using Switched Capacitor Integrators", *IEEE Trans on Solid-State Circuits*, vol. SC-12, No. 6, Dec. 1977, pp. 600-608.

Rumelhart, D. et al., *Parallel Distributed Processing*, vol. 1, copyright 1986 by The Massachusetts Inst. of Technology, pp. 45-54.

Kub, F. et al., "Programmable Analog Synapses for Microelectronic Neural Networks Using a Hybrid Digital-Analog Approach", *IEEE Int'l. Conf. on Neural Networks*, 1988.

Bibyk, S., et al., "Issues in Analog VLSI and MOS Techniques for Neural Computing", in *Analog VLSI Implementations of Neural Systems*, ed. by C. Mead et al., copyright 1989 by Kluwer Academic Publishers, Proceedings of a workshop held May 8, 1989 in connection with the Int'l. Symp. on Circuits and Systems, pp. 103-133.

"An Introduction to Computing With Neural Nets", R. P. Lippmann, *IEEE ASSP Magazine*, April 1987, pp. 4-22.

"Switched-Capacitor Neural Networks", Y. P. Tsividis & D. Anastassiou, *Electronics Letters*, Aug. 27, 1987, vol. 23, No. 18, pp. 958-959.

"Analog MOS Integrated Circuits for Signal Processing", R. Gregorian & G. C. Temes, pp. 255-237, John Wiley & Sons, NYC, Chichester, Brisbane, Toronto, Singapore 1986.

Electronics letters, vol. 23, No. 24, Nov. 19, 1987, (Stevenage, Herts., GB) Y. Tsividis et al.: "Analogue Circuits for Variable-Synapse Electronic Neural Networks," pp. 1313-1314.

Electronics, vol. 45, No. 4, Feb. 14, 1972 R. G. Kostanty: "Doubling op amp Summing Power", pp. 73-75, see FIG. 4; p. 75, paragraph: AC Considerations.

(List continued on next page.)

*Primary Examiner*—Stephen M. Baker
*Attorney, Agent, or Firm*—Marvin Snyder; James C. Davis, Jr.

[57] ABSTRACT

Neural nets using capacitive structures are adapted for construction in complementary metal-oxide-semiconductor integrated-circuit technology. Fully differential input amplifiers in each neural net layer apply their push-pull responses to synapse input signals via a pair of input lines. Each push-pull response is applied via a pair of capacitors of complementary capacitance values and an output line to the input of each of a plurality of nonlinear output amplifiers in that neural net layer, which generate respective axon responses for that neural net layer. In certain of these neural nets, arrangements are made such that the capacitive structures are bilaterally responsive so that back-propagation calculations can be performed during training periods, to alter the relative values of capacitors in each pair thereof.

57 Claims, 12 Drawing Sheets

OTHER PUBLICATIONS

Proceedings Neural Networks from Models to Applications, ESPCI, Paris, 1988, H. P. Graf et al.: "VLSI Neural Network for Fast Pattern Matrching", pp. 725–732.

International Journal of Electronics, vol. 64, No. 3, Mar. 1988, (London, GB) A. Chichocki et al.: "Switched-capacitor Function Generators", pp. 359–375.

Wescon 88, Conference Record, vol. 32, Nov. 1988, (North Hollywood, Calif., US), P. Hasler: "Implementing practical Neural Networks in Silicon", pp. SS/1/1–6.

FULLY DIFFERENTIAL AMPLIFIER — BIAS NETWORK

NON-LINEAR VOLTAGE FOLLOWER   BIAS NETWORK

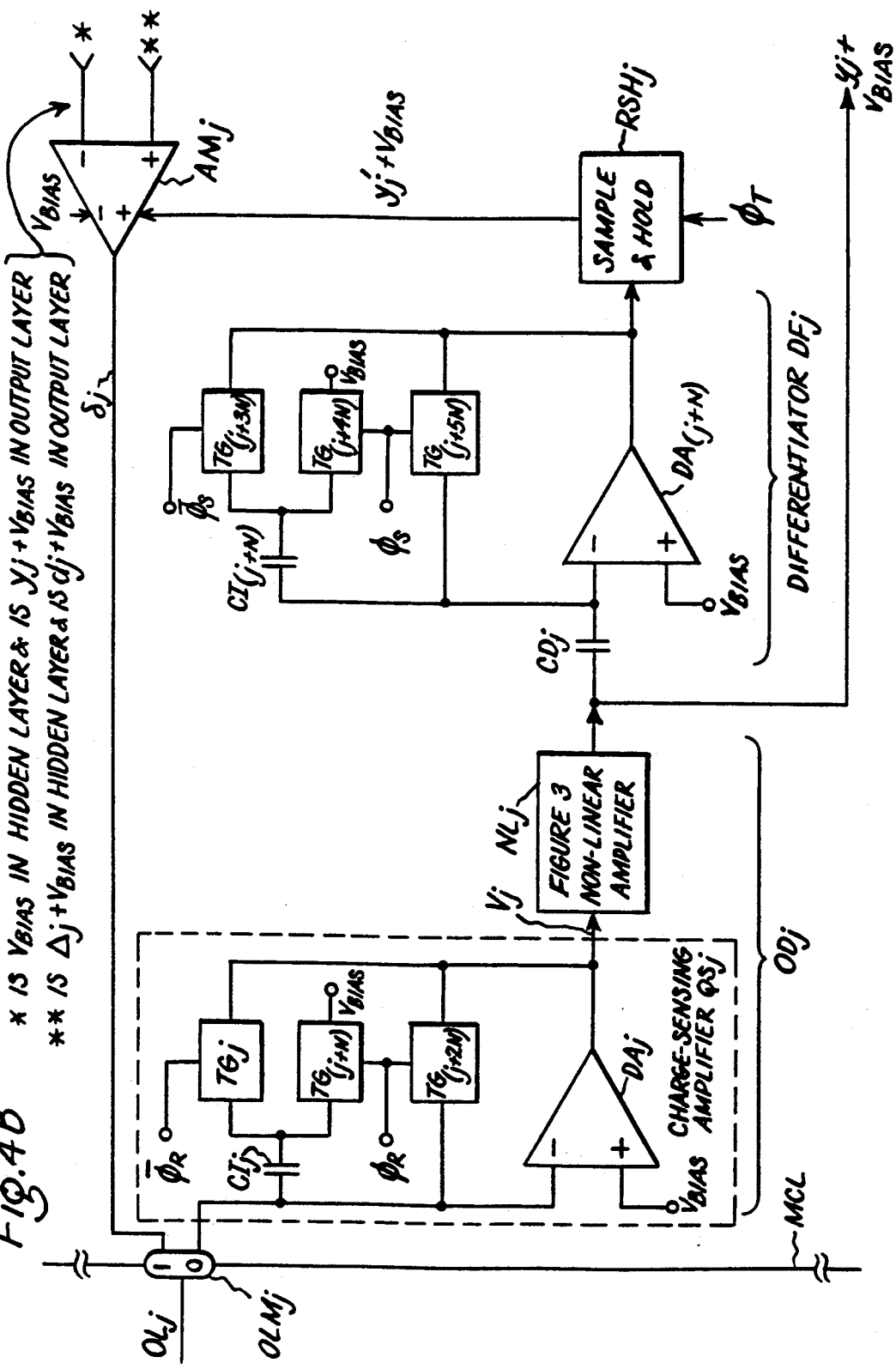

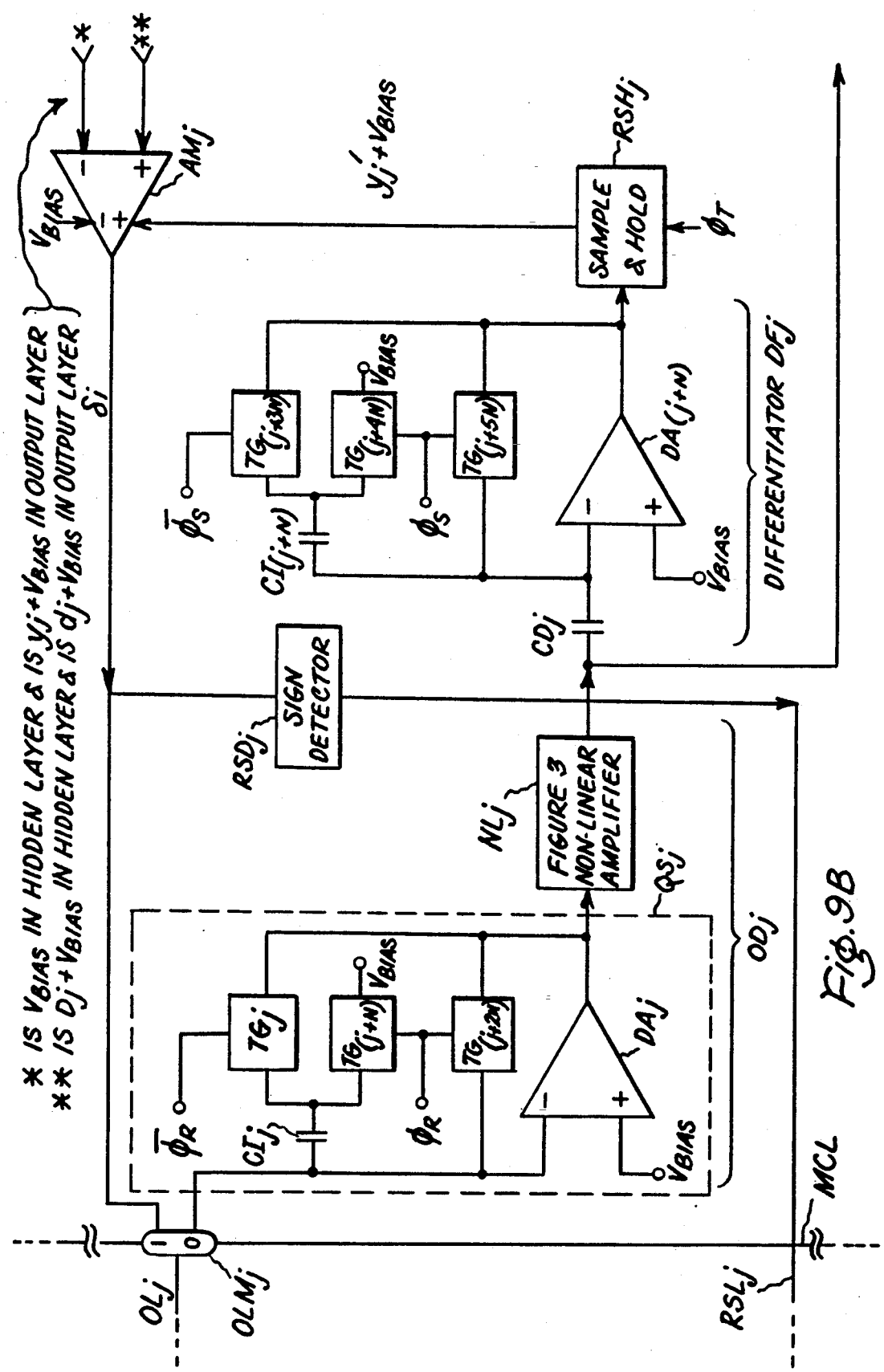

NEURAL NET USING CAPACITIVE STRUCTURES CONNECTING OUTPUT LINES AND DIFFERENTIALLY DRIVEN INPUT LINE PAIRS

The invention relates to computer structures that emulate portions of a brain in operation, and more particularly, to such computer structures as can be realized using complementary metal-oxide-semiconductor (CMOS) technology.

RELATIONSHIP TO OTHER DISCLOSURES

A patent application Ser. No. 366,838 concurrently filed by the inventor, entitled NEURAL NET USING CAPACITIVE STRUCTURES CONNECTING INPUT LINES AND DIFFERENTIALLY SENSED OUTPUT LINE PAIRS and assigned to General Electric Company, discloses alternative neural net structures to those described herein.

BACKGROUND OF THE INVENTION

Computers of the von Neumann type architecture have limited computational speed owing to the communication limitations of the single processor. These limitations may be overcome if a plurality of processors are utilized in the calculation and are operated at least partly in parallel. This alternative architecture, however, generally leads to difficulties associated with programming complexity. Therefore, it is often not a good solution. Recently, an entirely different alternative that does not require programming has shown promise. The networking ability of the neurons in the brain has served as a model for the formation of a highly interconnected set of processors, called a "neural network" or "neural net" that can provide computational and reasoning functions without the need of formal programming. The neural nets can learn the correct procedure by experience rather than being preprogrammed for performing the correct procedure. The reader is referred to R. P. Lippmann's article "An Introduction to Computing With Neural Nets" appearing on pages 4–21 of the April 1987 *IEEE ASSP MAGAZINE* (0740-7467/87/0400–0004/$10.00" 1987 IEEE), incorporated herein by reference, for background about the state of the art in regard to neural nets.

Neural nets are composed of a plurality of neuron models, processors each exhibiting "axon" output signal response to a plurality of "synapse" input signals. In a type of neural net called a "perceptron", each of these processors calculates the weighted sum of its "synapse" input signals, which are respectively weighted by respective weighting values that may be positive- or negative-valued, and responds non-linearly to the weighted sum to generate the "axon" output response. This relationship may be described in mathematical symbols as follows.

$$v_j = f\left(\sum_{i=1}^{M} W_{i,j} x_i\right) \quad j = 1, 2, \ldots N \quad (1)$$

Here, i indexes the input signals of the perceptron, of which there are an integral number M, and j indexes its N output signals, of which there are an integral number N. $W_{i,j}$ is the weighting of the $i^{th}$ input signal as makes up the $j^{th}$ output signal at such low input signal levels that the function $$f\left(\sum_{i=1}^{M} W_{i,j} x_i\right)$$

is approximately linear. At higher absolute values of its argument, the function $$f\left(\sum_{i=1}^{M} W_{i,j} x_i\right)$$

no longer exhibits linearity but rather exhibits a reduced response to $$\sum_{i=1}^{M} W_{i,j} x_i.$$

A more complex artificial neural network arranges a plurality of perceptrons in hierarchic layers, the output signals of each earlier layer providing input signals for the next succeeding layer. Those layers preceding the output layer providing the ultimate output signal(s) are called "hidden" layers.

The processing just described normally involves sampled-data analog signals, and prior-art neural nets have employed operational amplifiers with resistive interconnecting elements for the weighting and summing procedures. The resistive elements implement weighted summation being done in accordance with Ohm's Law. The speed of such a processor is limited by capacitances in various portions of the processor, and computations have been slow if the power consumption of a reasonably large neural net is to be held within reasonable bounds. That is, speed is increased by reducing resistance values to reduce RC time constants in the processors, but the reduced resistance values increase the $V^2/R$ power consumption (R, C and V being resistance, capacitance and voltage, respectively.) Using capacitors to perform weighted summation in accordance with Coulomb's Law provide neural nets of given size operating at given speed that consume less power than those the processors which use resistors to implement weighted summation in accordance with Ohm's Law. Y. P. Tsividis and D. Anastassion in a letter "Switched-Capacitor Neural Networks" appearing in ELECTRONICS LETTERS, Aug. 27, 1987, Vol. 23, No. 18, pages 958,959 (IEE) describe one method of implementing weighted summation in accordance with Coulomb's Law. Their method, a switched capacitor method, is useful in analog sampled-data neural net systems. However, a method of implementing weighted summation in accordance with Coulomb's Law that does not rely on capacitances being switched is desirable, it is here pointed out. This avoids the complexity of the capacitor switching elements and associated control lines. Furthermore, operation of the neural net with continuous analog signals over sustained periods of time, as well as with sampled data analog signals, is thus made possible.

A problem that is encountered when one attempts to use capacitors to perform weighted summation in a neural net layer is associated with the stray capacitance between input and output lines, which tends to be of appreciable size in neural net layers constructed using a metal-oxide-semiconductor (MOS) integrated circuit technology. The input and output lines are usually laid out as overlapping column and row busses using plural-layer metallization. The column busses are situated in one layer of metallization and the row busses are situated in another layer of metallization separated from the other layer by an intervening insulating oxide layer. This oxide layer is thin so there is appreciable capacitance at each crossing of one bus over another. The fact of the row and column busses being in different planes tends to increase stray capacitances between them. The stray capacitance problem is also noted where both row and column busses are situated in the same metallization layer with one set of busses being periodically interrupted in their self-connections to allow passage of the other set of busses and being provided with cross-over connections to complete their self-connections. The problem of stray capacitance is compounded by the fact that the capacitive elements used to provide weights in a capacitive voltage summation network have stray capacitances to the substrate of the monolithic integrated circuit in which they are incorporated; a perfect two-terminal capacitance is not actually available in the monolithic integrated circuit. Where capacitive elements having programmable capacitances are used, capacitance is usually not programmable to zero value, either.

The foregoing problems with stray capacitance are solved in the invention by using balanced input line pairs, so that the effects of stray capacitance from each output line tend to cancel out each other. Driving paired input lines with balanced input signals also allows both excitory and inhibitory weights—that is, both positive- and negative-polarity $W_{i,j}$—in effect to be achieved without having to resort to capacitor switching in order to achieve negative capacitance. The $W_{i,j}x_i$ terms are obtained by summing weighted $x_i$ and $-x_i$ balanced input signals.

Neural nets employing capacitors in accordance with the invention lend themselves to being used in performing parts of the computations needed to implement a back-propagation training algorithm. The back-propagation training algorithm is an iterative gradient algorithm designed to minimize the mean square error between the actual output of a multi-layer feed-forward neural net and the desired output. It requires continuous, differentiable non-linearities. A recursive algorithm starting at the output nodes and working back to the first hidden layer is used iteratively to adjust weights in accordance with the following formula.

$$W_{i,j}(t+1) = W_{i,j}(t) - \eta \delta_j x_i \qquad (2)$$

In this equation $W_{i,j}(t)$ is the weight from hidden node i (or, in the case of the first hidden layer, from an input node) to node j at time t; $x_i$ is the output signal of node i (which, in the case of the first hidden layer, an input signal); $\eta$ is a gain term introduced to maintain stability in the feedback procedure used to minimize the mean square errors between the actual output(s) of the neural net and its desired output(s); and $\delta_j$ is a derivative of error term for the node j. The general definition of $\delta_j$ is the change in error energy from output node j of a neural net layer with a change in the weighted summation of the input signals used to supply that output node j.

Lippman presumes that a particular sigmoid logistic non-linearity is used. Presuming the non-linearity of processor response is to be defined not as restrictively as Lippman does, then $\delta_j$ can be more particularly defined as in equation (3), following, if node j is an output node, or as in equation (4), following, if node j is an internal hidden node.

$$\delta_j = y_j'(d_j - y_j) \qquad (3)$$

$$\delta_j = y_j' \sum_k \delta_k W_{j,k} \qquad (4)$$

In equation (3) $d_j$ and $y_j$ are the desired and actual values of output response from the output layer and $y_j'$ is differential response of $y_j$ to the non-linearity in the output layer—i.e., the slope of the transfer function of that non-linearity. In equation (4) k is over all nodes in the neural net layer succeeding the hidden node j under consideration and $W_{j,k}$ is the weight between node j and each such node k. The term $y_j'$ is defined in the same way as in equation (3).

The general definition of the $y_j'$ term appearing in equations (3) and (4), rather than that general term being replaced by the specific value of $y_j'$ associated with a specific sigmoid logistic non-linearity, is the primary difference between the training algorithm as described here and as described by Lippmann. Also, Lippman defines $\delta_j$ in opposite polarity from equations (1), (3) and (4) above.

During training of the neural net prescribed patterns of input signals are sequentially repetitively applied, for which patterns of input signals there are corresponding prescribed patterns of output signals known. The pattern of output signals generated by the neural net, responsive to each prescribed pattern of input signals, is compared to the prescribed pattern of output signals to develop error signals, which are used to adjust the weights per equation (2) as the pattern of input signals is repeated several times, or until the error signals are detected as being negligibly valued. Then training is done with the next set of patterns in the sequence. During extensive training the sequence of patterns may be recycled.

SUMMARY OF THE INVENTION

The invention generally concerns neural nets the processors of which use capacitors to perform weighted summation in accordance with Coulomb's Law. Each processor includes an output line on which the weighted summation of input signal voltages appears and a non-linear amplifier for providing neuron-like response to that weighted summation. A plurality, 2M in number, of input lines, crossing by that output line and exhibiting a stray capacitance thereto, are each connected to that output line by a respective capacitive element. Each input line and the capacitive element connecting it to the output line are identified by a respective one of consecutive ordinal numbers first through $2M^{th}$, M being a positive integer. Means are provided for applying M input signal voltages in balanced form each to a respective pair of input lines identified by ordinal numbers M apart. The differences in the capacitances of the capacitive elements connecting to the output line from each pair of input lines determines the weighting of the input signal applied in balanced form on that pair of input lines, as appears in the weighted summation of input signal on the outline line. Accordingly, the effects of stray capacitance on the weighted summation of input signals is reduced.

BRIEF DESCRIPTION OF THE DRAWING

FIGS. 4A and 4B together form a FIG. 4 that is a schematic diagram of a modification of the FIG. 1 neural net that can be made manifold times to provide, in accordance with a further aspect of the invention, for the programmable weighting of the capacitances used in performing weighted summation of synapse signals.

Figure 1:
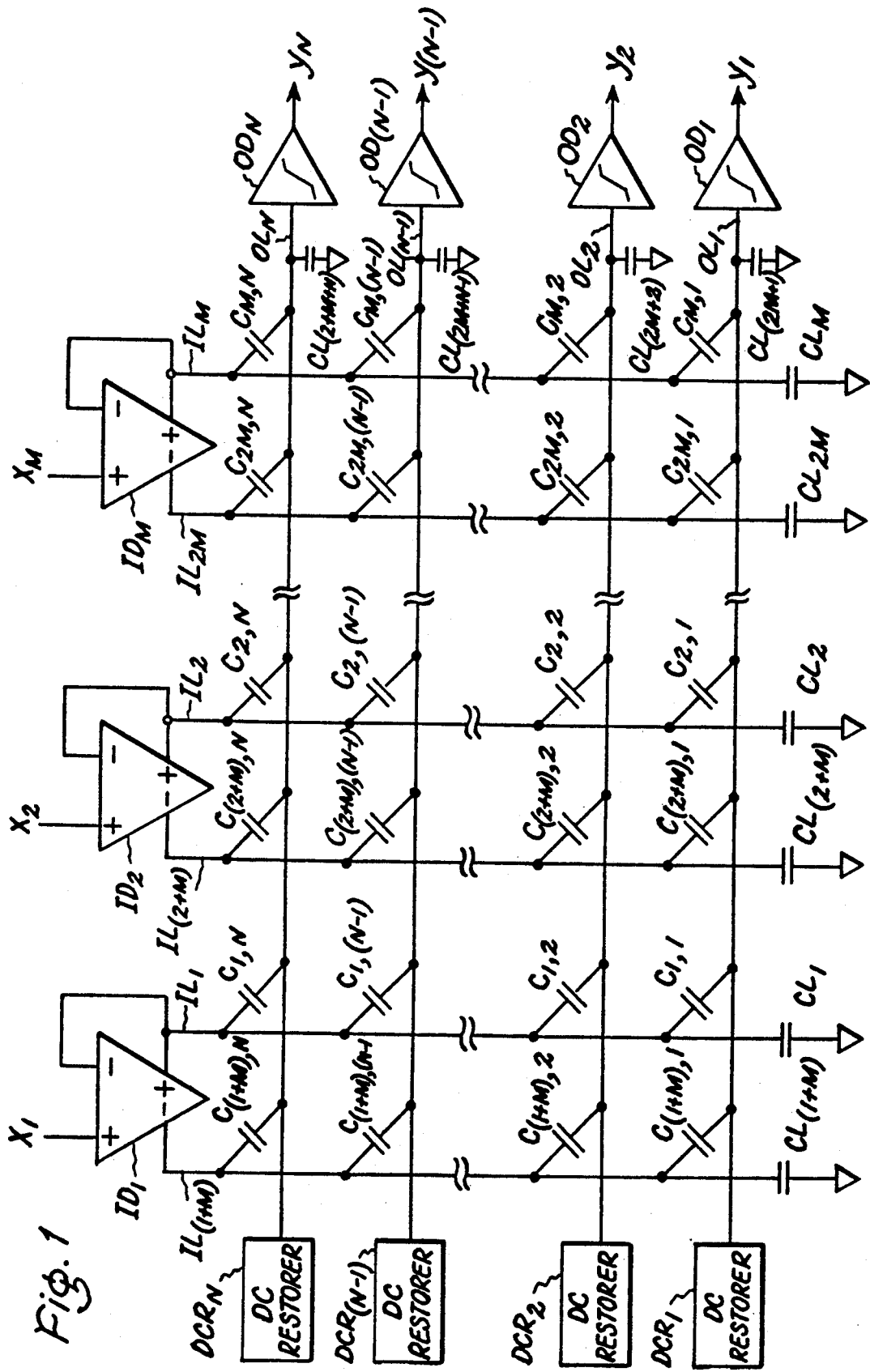
FIG. 1 is a schematic diagram of a neural net layer which embodies the invention, using capacitors to perform weighted summations of synapse signals to be subsequently non-linearly amplified to generate axon response signals.
Figure 4A:
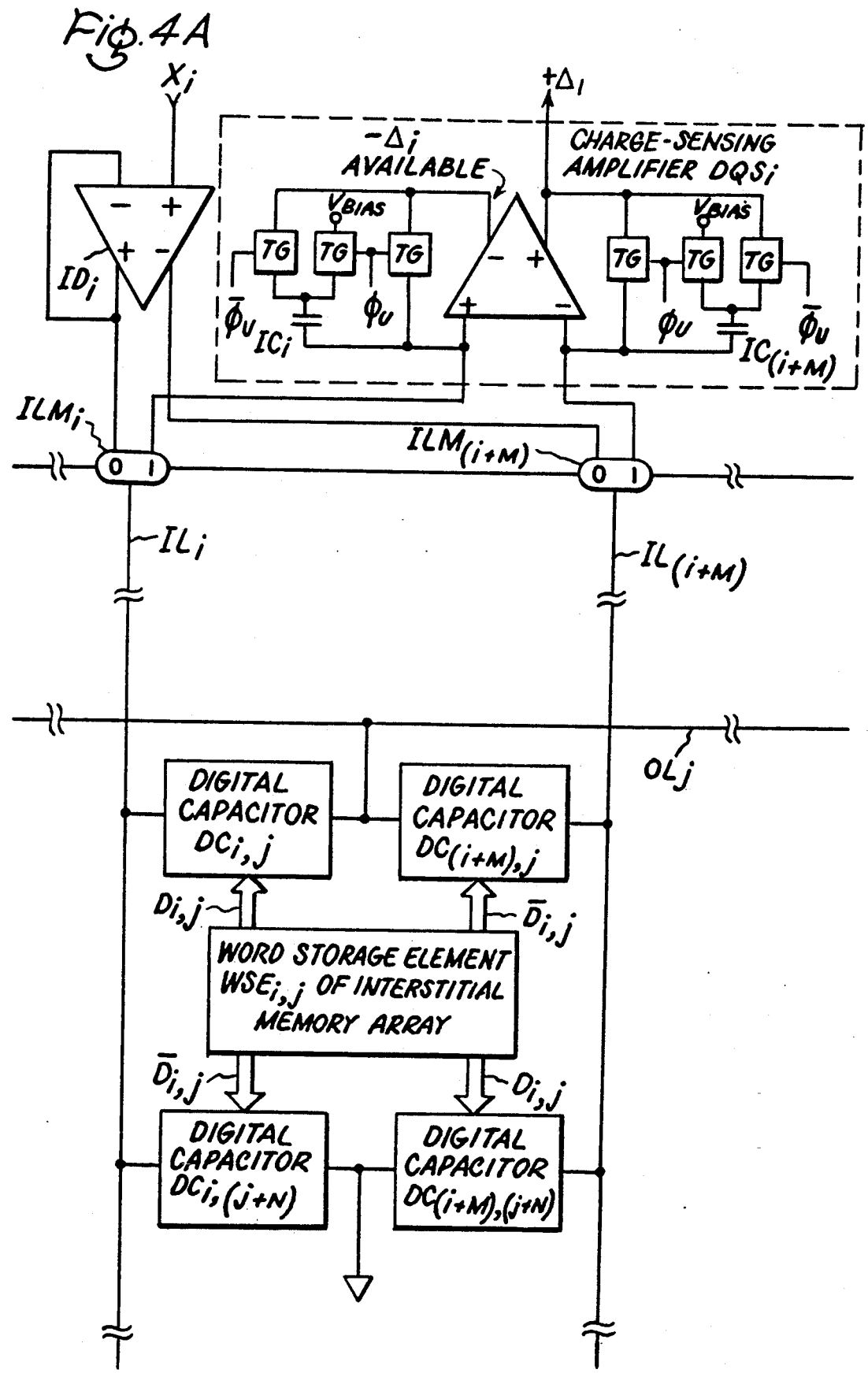
Figure 5:
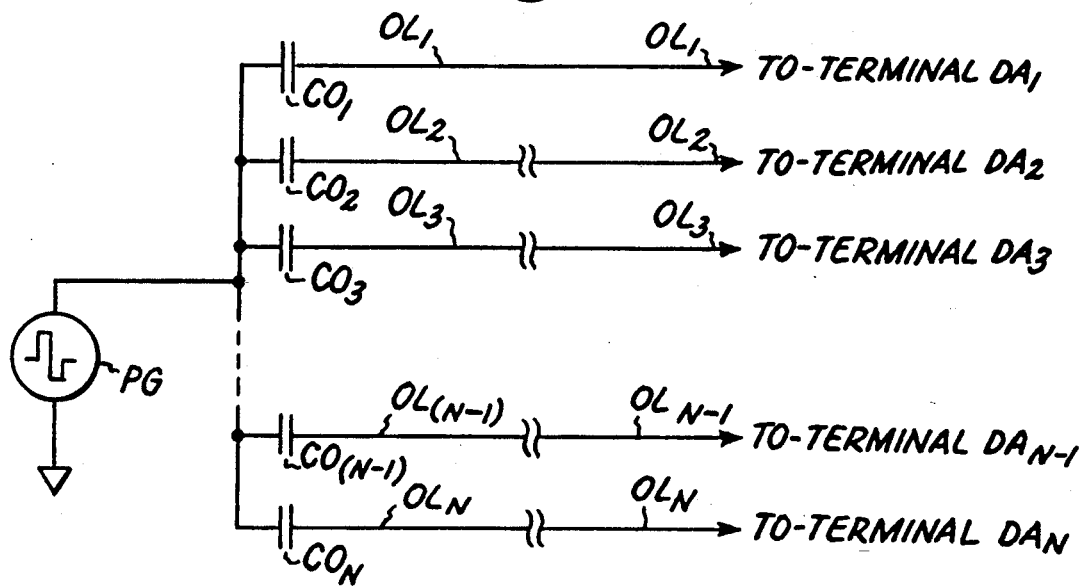
Figure 6:
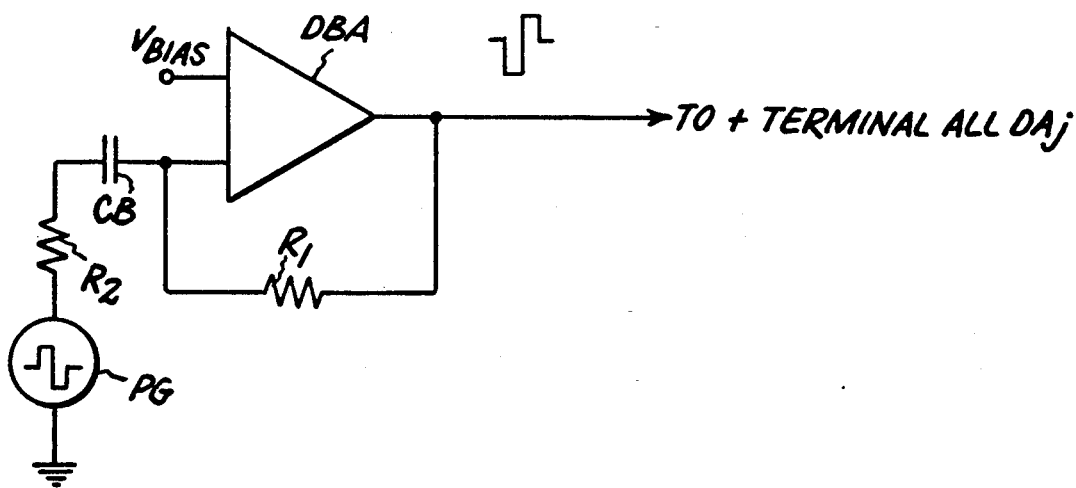

Each of FIGS. 5 and 6 is a schematic diagram illustrating one way of pulsing the non-linear output driver amplifiers in a FIG. 1 neural net layer modified manifoldly per FIG. 4.

Figure 7:
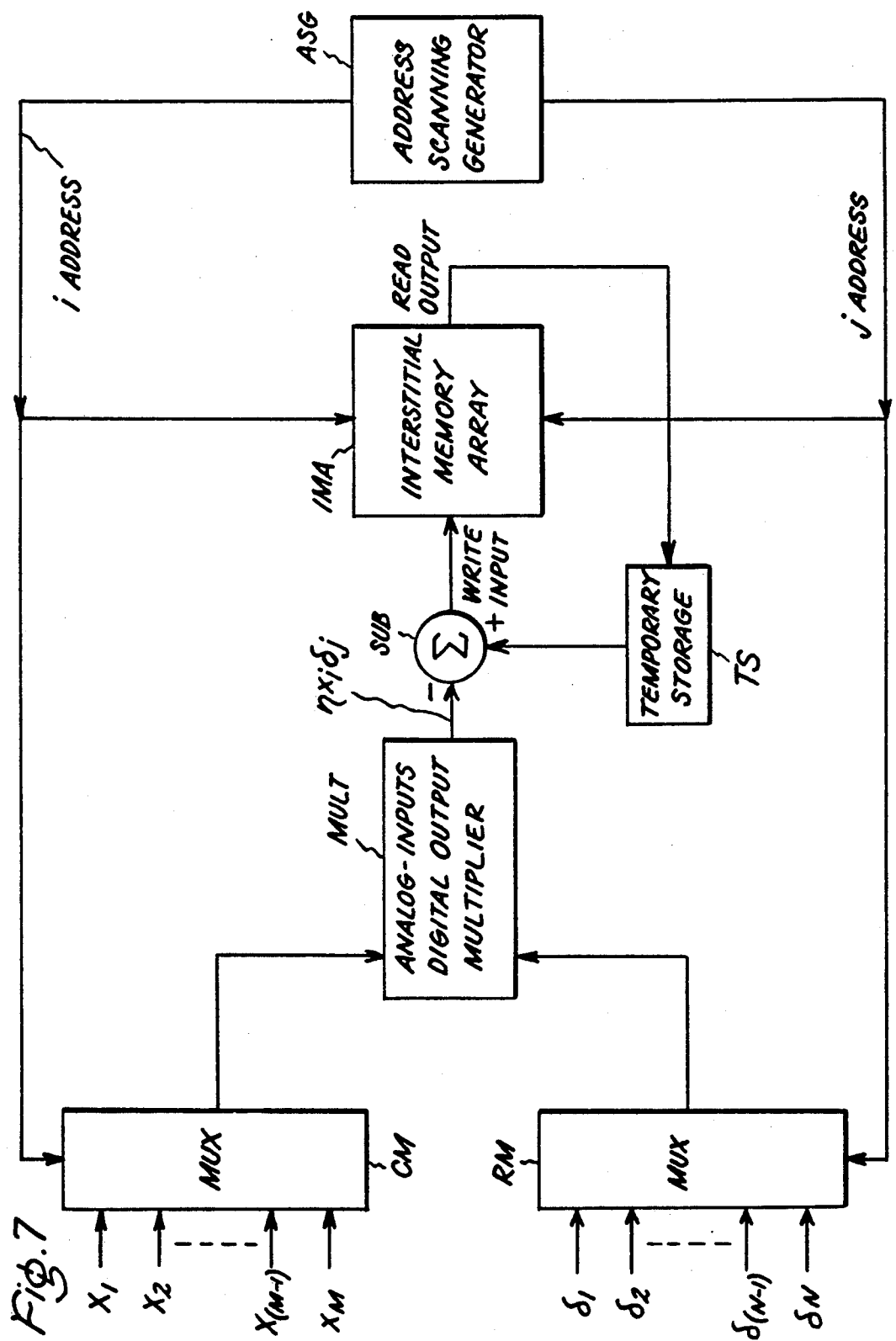

FIG. 7 is a schematic diagram of training apparatus used with the FIG. 1 neural net layer manifoldly modified per FIG. 4.

Figure 8:
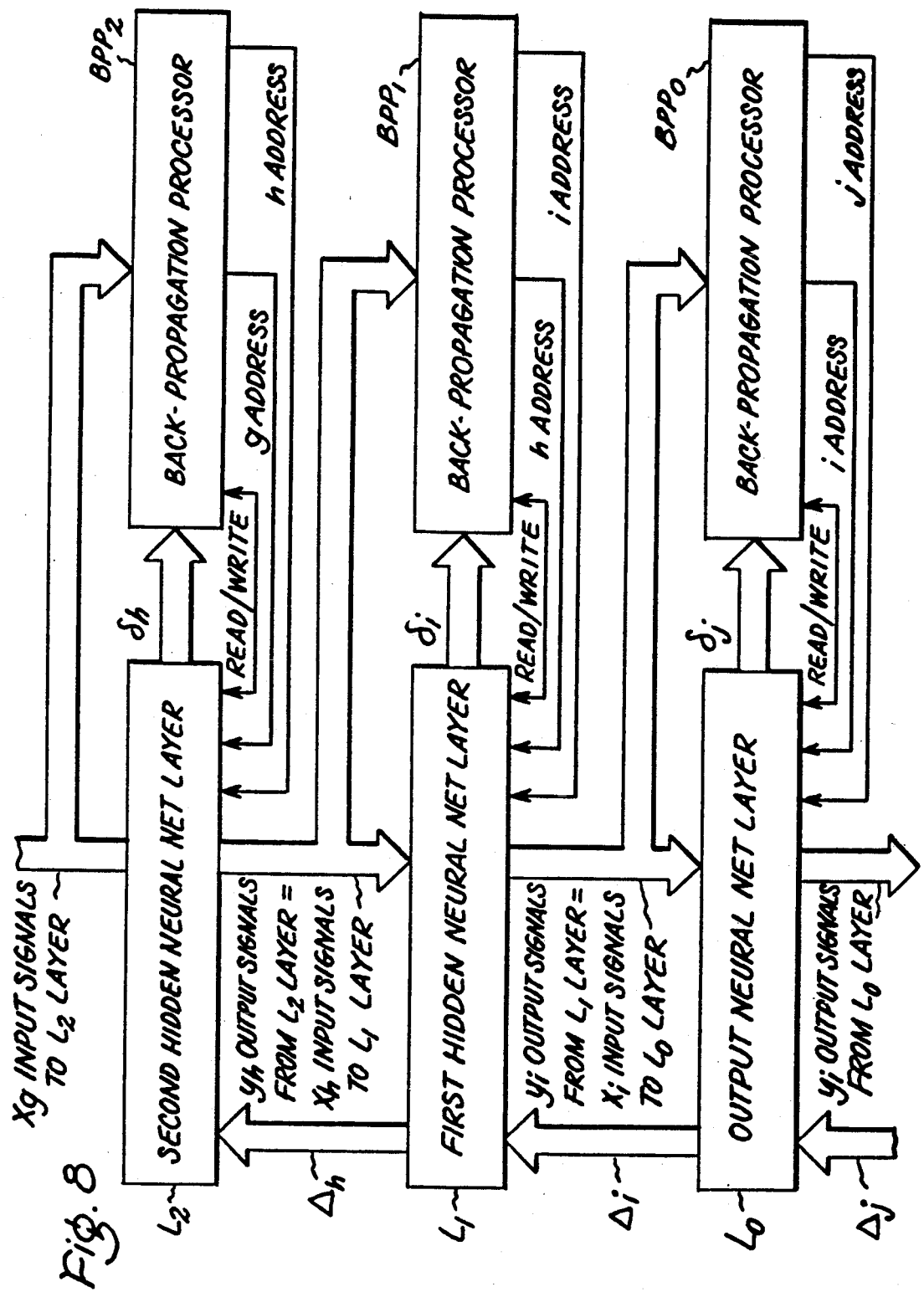

FIG. 8 is a schematic diagram of a system having a plurality of neural net layers each constructed in accordance with FIG. 1 modified manifold times per FIG. 4.

Figure 9A:
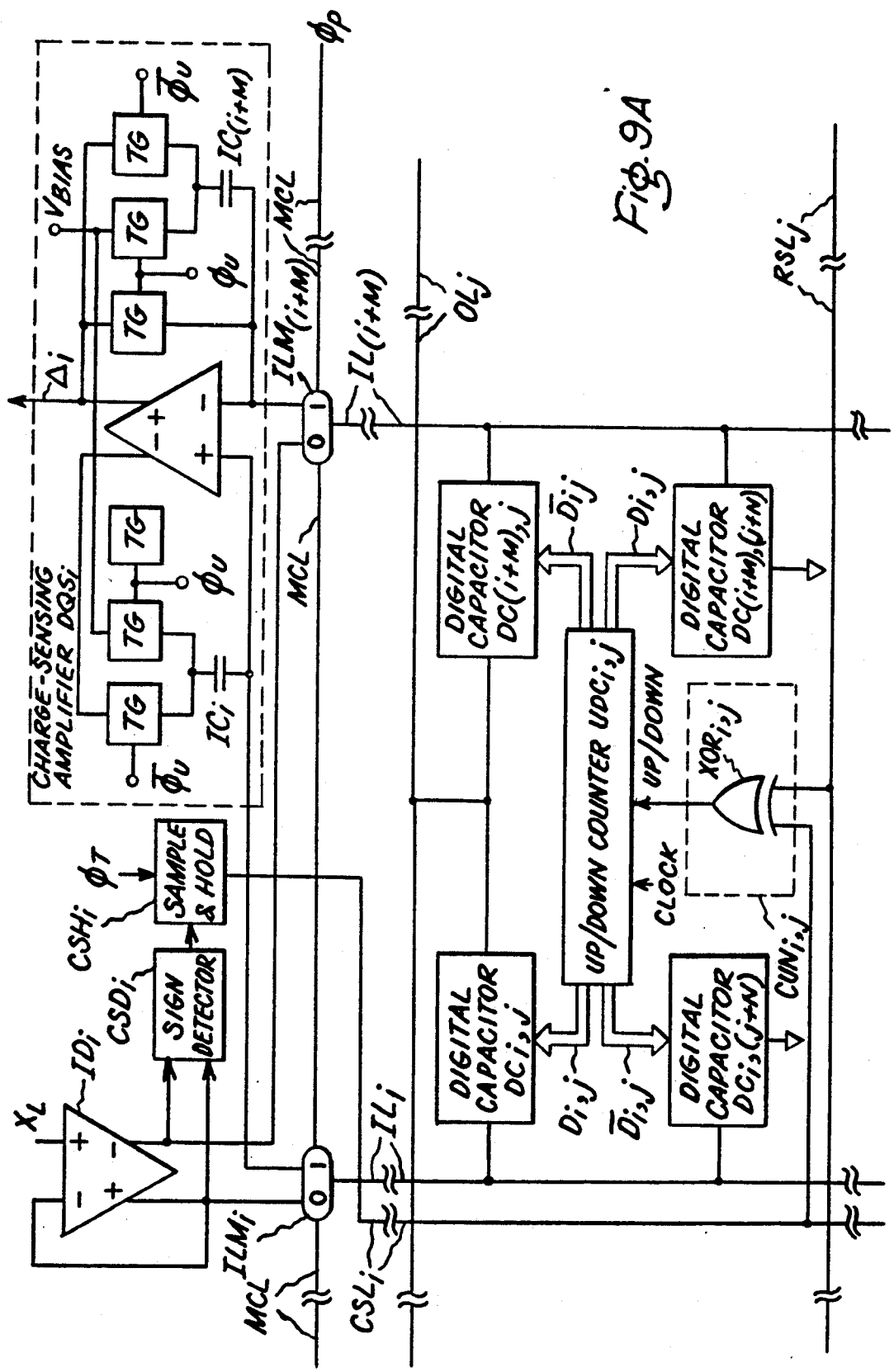

FIGS. 9A and 9B together form a FIG. 9 that is a schematic diagram of an alternative modification of the FIG. 1 neural net that can be made manifold times to provide during training for the programmable weighting of the capacitances used in performing weighted summation of synapse signals, in accordance with another aspect of the invention.

Figure 10:
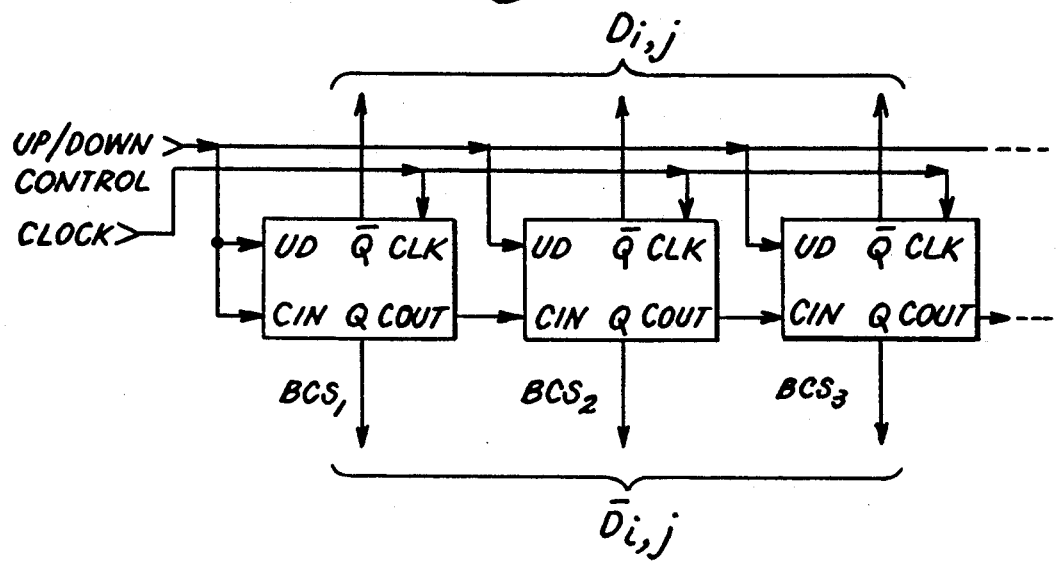

FIG. 10 is a schematic diagram of the arrangement of stages in each counter of the FIG. 1 neural net modified per FIG. 9.

Figure 11:
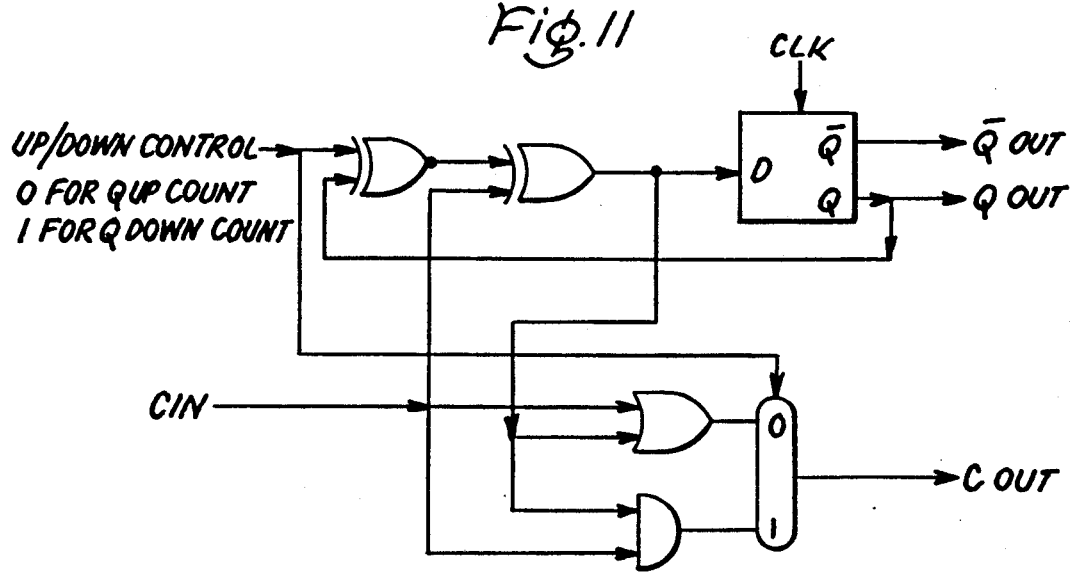

FIG. 11 is a schematic diagram of the logic elements included in each counter stage.

Figure 12:
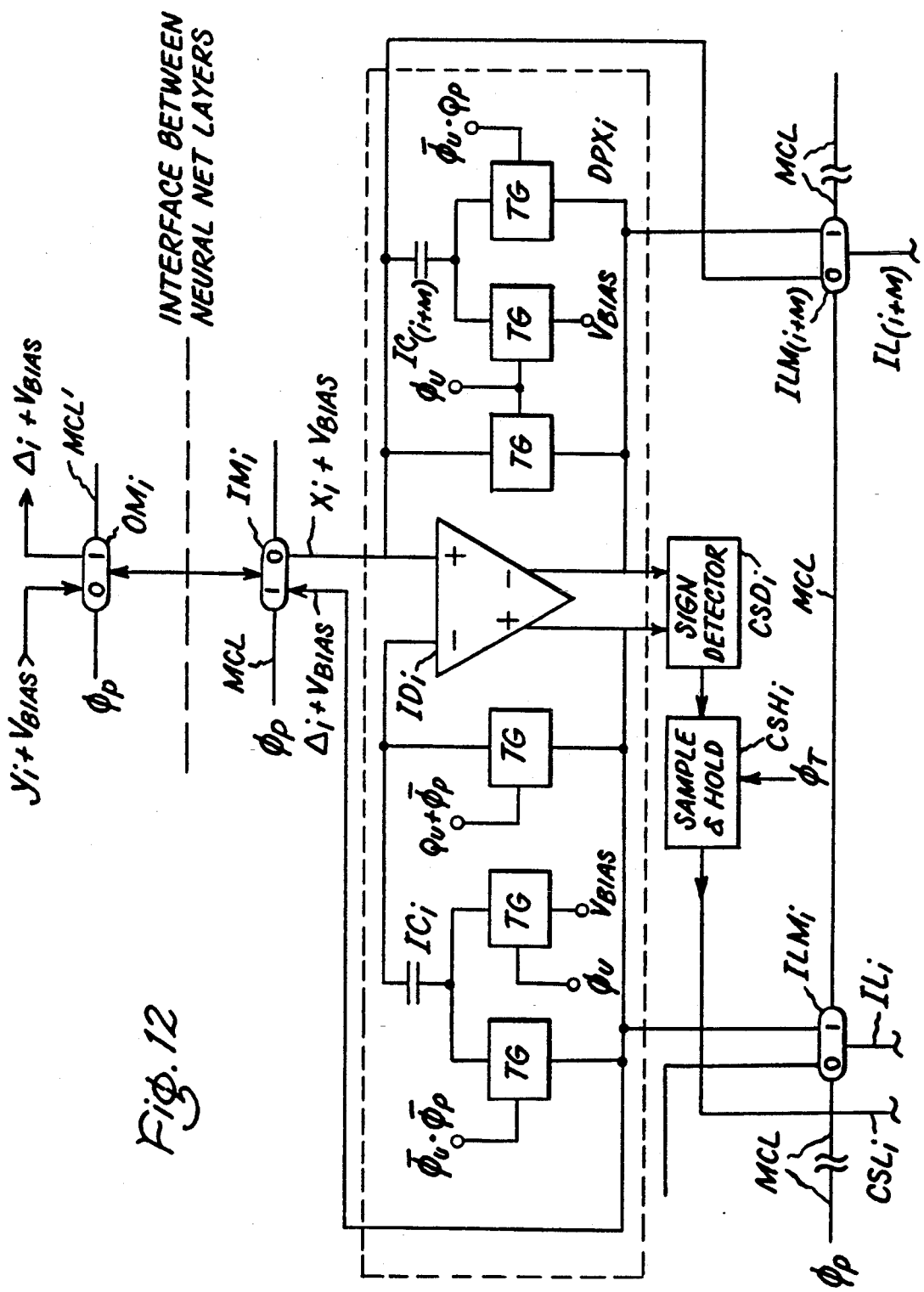

FIG. 12 is a schematic diagram of further modifications that can be made to the neural net layers in further embodiments of the invention, which further modification halves the number of connections between neural net layers and reduces the number of fully differential amplifiers required in each neural net layer.

DETAILED DESCRIPTION

FIG. 1 shows a neural net comprising a plurality, N in number, of non-linear amplifiers $OD_1$, $OD_2$, ... $OD_{(N-1)}$, $OD_N$ supplied respective input voltages from apparatus for matrix multiplying as described by the inventor in U.S. Pat. No. 4,156,284 issued May 22, 1979, entitled "SIGNAL PROCESSING APPARATUS" and assigned to General Electric Company. The apparatus for matrix multiplying weights each of a plurality, M in number, of input voltage signals $x_1$, $x_2$, ... $x_{(M-1)}$, $x_M$ supplied as "synapse" signals to provide the respective input voltages for the non-linear voltage amplifiers $OD_1$, $OD_2$, ... $OD_{N-1}$, $OD_N$, which generate respective "axon" responses $y_1$, $y_2$, ... $Y_{(N-1)}$, $y_N$.

M is a positive plural integer indicating the number of input synapse signals to the FIG. 1 net, and N is a positive plural integer indicating the number of output axon signals the FIG. 1 net can generate. To reduce the written material required to describe operation of the FIG. 1 neural net, operations using replicated elements will be described in general terms; using a subscript i ranging over all values one through M for describing operations and apparatuses as they relate to the (column) input signals $x_1$, $x_2$, ... $x_{(M-1)}$, $x_M$; and using a subscript j ranging over all values one through N for describing operations and apparatus as they relate to the (row) output signals $y_1$, $y_2$, ... $y_{(N-1)}$, $Y_N$. That is, i and j are the column and row numbers used to describe particular portions of the neural net.

Input voltage signal $x_i$ is applied to the input port of an input driver amplifier $ID_i$ that in turn applies its non-inverted voltage response from its (+) output port to an input line $IL_i$ and applies its inverted voltage response from its (−) output port to an input line $IL_{(i+M)}$. A respective output line $OL_j$ connects to the input port of output driver amplifier $OD_j$, which generates at its output port a nonlinear voltage response to the cumulative charge on that respective output line $OL_j$.

Figure 2:
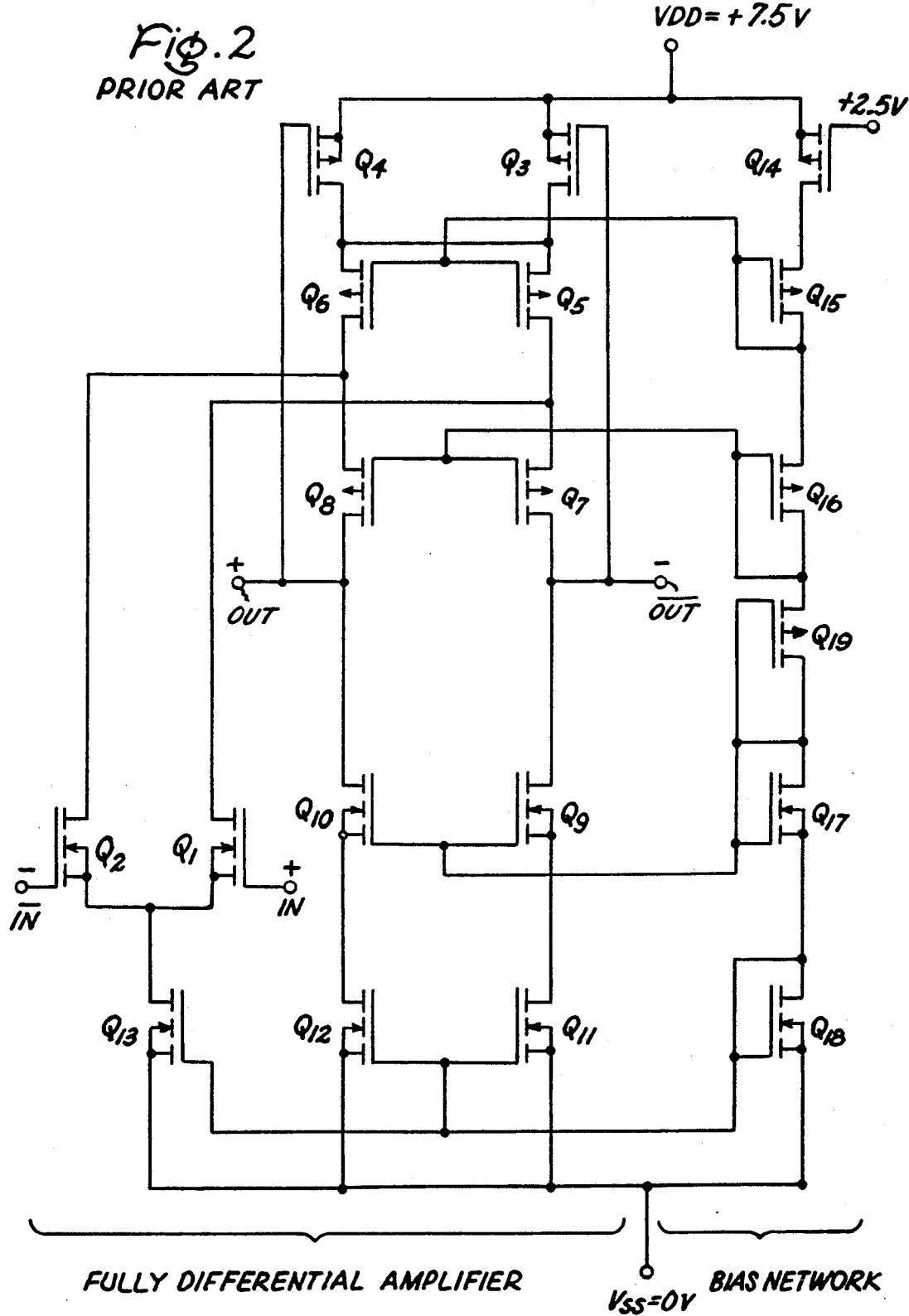
FIG. 2 is a schematic diagram of a prior art fully differential amplifier and a bias network therefore, as implemented with complementary metal-oxide-semiconductor CMOS field effect transistors, which is useful in the construction of neural nets in accordance with the invention.

FIG. 2 shows a fully differential amplifier constructed of MOS field-effect transistors $Q_1$–$Q_{13}$, as may serve for any one of the input driver amplifiers $ID_i$ for i=1, 2, ... M. Also shown is a bias network constructed of MOS field effect transistors $Q_{14}$–$Q_{19}$ for generating direct bias potentials for application to that fully differential amplifier and to others of its kind. This circuitry is described in more detail on pages 255–257 of the book *Analog MOS Integrated Circuits for Signal Processing* by R. Gregorian and G. C. Temes, copyright 1986 by John Wiley & Sons, Inc., of New York, Chichester, Brisbane, Toronto and Singapore.

The fully differential amplifier includes a long-tailed-pair connection of n-channel MOSFETs $Q_1$ and $Q_2$ providing common-mode rejection for the input voltages IN and IN applied to the (+) and (−) input terminals at their respective gate electrodes. N-channel MOSFET $Q_{13}$ is connected as a constant-current sink for tail current from the interconnection between the source electrodes of $Q_1$ and $Q_L$. $Q_1$ and $Q_2$ are in folded cascode connections with p-channel MOSFETs $Q_7$ and $Q_8$ respectively. There is also common mode rejection for output voltages OUT and OUT appearing at the (+) and (−) output terminals connecting from the drain electrodes of $Q_7$ and $Q_8$ respectively, which is why the differential amplifier comprising $Q_1$–$Q_{13}$ is described as being "fully" differential. This common mode rejection is provided by common-mode degenerative feedback connections from the (−) and (+) output terminals to the gate electrodes of p-channel MOSFETs $Q_3$ and $Q_4$, the paralleled source-to-drain paths of which supply current to the joined source electrodes of p-channel MOSFETs $Q_5$ and $Q_6$ operated as a current splitter. $Q_5$ drain current biases the folded cascode connection of $Q_1$ and $Q_7$, and $Q_6$ drain current biases the folded cascode connection of $Q_2$ and $Q_8$. N-channel MOSFETs $Q_9$ and $Q_{11}$ are in a cascode connection biased to provide a high-impedance constant-current sink as drain load to $Q_7$, and n-channel MOSFETs $Q_{10}$ and $Q_{12}$ are in a cascode connection biased to provide a high-impedance constant-current sink as drain load to $Q_8$.

The (+) and (−) output terminals can be biased to the same (+2.5 v) potential as applied to the gate electrode of MOSFET $Q_{14}$ by causing MOSFETs $Q_1$–$Q_{18}$ to have the following width-to-length ratios presuming $Q_1$, $Q_2$, $Q_7$ and $Q_8$ to have equal amplitude quiescent channel currents.

| | | | | | |
|---|---|---|---|---|---|
| (W/L)$_{11}$: | (W/L)$_{12}$: | (W/L)$_{13}$: | (W/L)$_{18}$:: | 2:2:1:1 | (5) |
| (W/L)$_3$: | (W/L)$_4$: | (W/L)$_{14}$:: | | 1:1:1 | (6) |
| (W/L)$_5$: | (W/L)$_6$: | (W/L)$_{15}$:: | | 1:1:1 | (7) |
| (W/L)$_7$: | (W/L)$_8$: | (W/L)$_{16}$:: | | 2:2:1 | (8) |
| (W/L)$_9$: | (W/L)$_{10}$: | (W/L)$_{17}$:: | | 2:2:1 | (9) |

The width-to-length ratio of MOSFET $Q_{19}$ is chosen to provide responsive to drain current demand of $QW_{14}$ a voltage drop across $Q_{19}$ channel that affords a sufficient operating range for signals at terminals OUT and $\overline{OUT}$. This proportioning of $Q_1$-$Q_{18}$ and a respective degenerative feedback connection from its (+) output terminal to its (−) input terminal conditions each of the input driver amplifiers $ID_i$ in the FIG. 1 neural net to provide $x_i$ voltage-follower response at its (+) output terminal to $x_i$ signal applied to its (+) input terminal and to provide inverted, $-x_i$ response at its (−) output terminal.

The non-linear output driver amplifier $OD_j$ is shown in FIG. 1 as being just a non-linear voltage amplifier with the quiescent direct potential applied to its input signal terminal via output line $OL_j$ being adjusted by clamping to a desired bias voltage at selected times using a respective direct-current restorer circuit $DCR_j$. The restorer circuit $DCR_j$ is shown separated from non-linear output driver $OD_j$ in FIG. 1 to improve the layout of the drawing, but customarily is more closely associated with the output driver $OD_j$, in accordance with customary practice in dc restoration. A respective capacitor $C_{i,j}$ connects each of the input lines $IL_i$ to each of the output lines $OL_j$, and a respective capacitor $C_{(i+M),j}$ connects to each of the output lines $OL_j$ the one of the input lines $IL_{(i+M)}$ paired with that $IL_i$. Since the paired $IL_i$ and $IL_{(i+M)}$ input lines are driven with $x_i$ and $-x_i$ signal voltages respectively, the electrically equivalent circuit is $x_i$ signal voltage being applied to output line $OL_j$ by a capacitor having a capacitance that equals the capacitance of $C_{i,j}$ minus the capacitance of $C_{(i+M),j}$. This balanced input signal drive to paired input lines technique avoids the need for switched-capacitance techniques in order to obtain inhibitory as well as excitory weights, and thus facilitates operating the neural net with analog signals that are continuous over sustained periods of time, if so desired.

FIG. 1 shows each of the input lines $IL_i$ or $IL_{(i+M)}$ as being provided with a respective load capacitor $CL_i$ or $CL_{(i+M)}$ to cause that capacitive loading upon each of the output terminals of the input driver amplifier $ID_i$ to be substantially the same as that upon each output port of the other input driver amplifiers. This is desirable for avoiding unwanted differential delay in responses to the input signals $x_i$. Substantially equal capacitive loading can be achieved by making the capacitance of each of the input line loading capacitors $CL_1$-$CL_{2M}$ very large compared to the total capacitance of the capacitors $C_{i,j}$ or $C_{(i+M),j}$ connecting thereto. Preferably, however, this result is achieved by making the capacitance of each of the input line loading capacitors complement the combined value of the other capacitances connecting thereto. This procedure reduces the amount of line loading capacitance required. Where the voltage appearing on the output lines is sensed directly by the non-linear output driver amplifiers $OD_1$, . . . $OD_N$, as shown in FIG. 1, this preferable procedure makes the voltage division ratio for each input voltage $x_i$, . . . $x_M$ independent of the voltage division ratios for the other input voltages. Where the charge appearing on the output lines is sensed by charge-sensing amplifiers preceding the non-linear output driver amplifiers, as will be described later on in this specification in connection with FIG. 4, this latter consideration is not as important.

FIG. 1 also shows each of the output lines $OL_j$ being loaded with a respective load capacitor $CL_{(2M+j)}$ to cause the total capacitance on that line to remain substantially the same as on each of the other output lines. Again, this can be done either by choosing $CL_{(2M+j)}$ to be much larger than other capacitances to output line $OL_j$, or by choosing $CL_{(2M+j)}$ to complement the combined value of the other capacitances connecting thereto. The input voltage to output driver amplifier $OD_j$ will (to good approximation) have the following value, $v_j$, in accordance with Coulomb's Law.

$$v_j = (C_j)^{-1} \sum_{i=1}^{M} (C_{i,j} - C_{(i+M),j}) x_i \tag{10}$$

Here $C_j$ is the total capacitance on output line $OL_j$. The generation of voltage $v_j$ can be viewed as the superposition of a plurality of capacitive divisions between, on the one hand, the effective capacitance $(C_{(i,j)} - C_{(i+M),j})$ each input voltage has to output line $OL_j$ and, on the other hand, the total capacitance $C_j$ of the output line to its surroundings.

Figure 3:
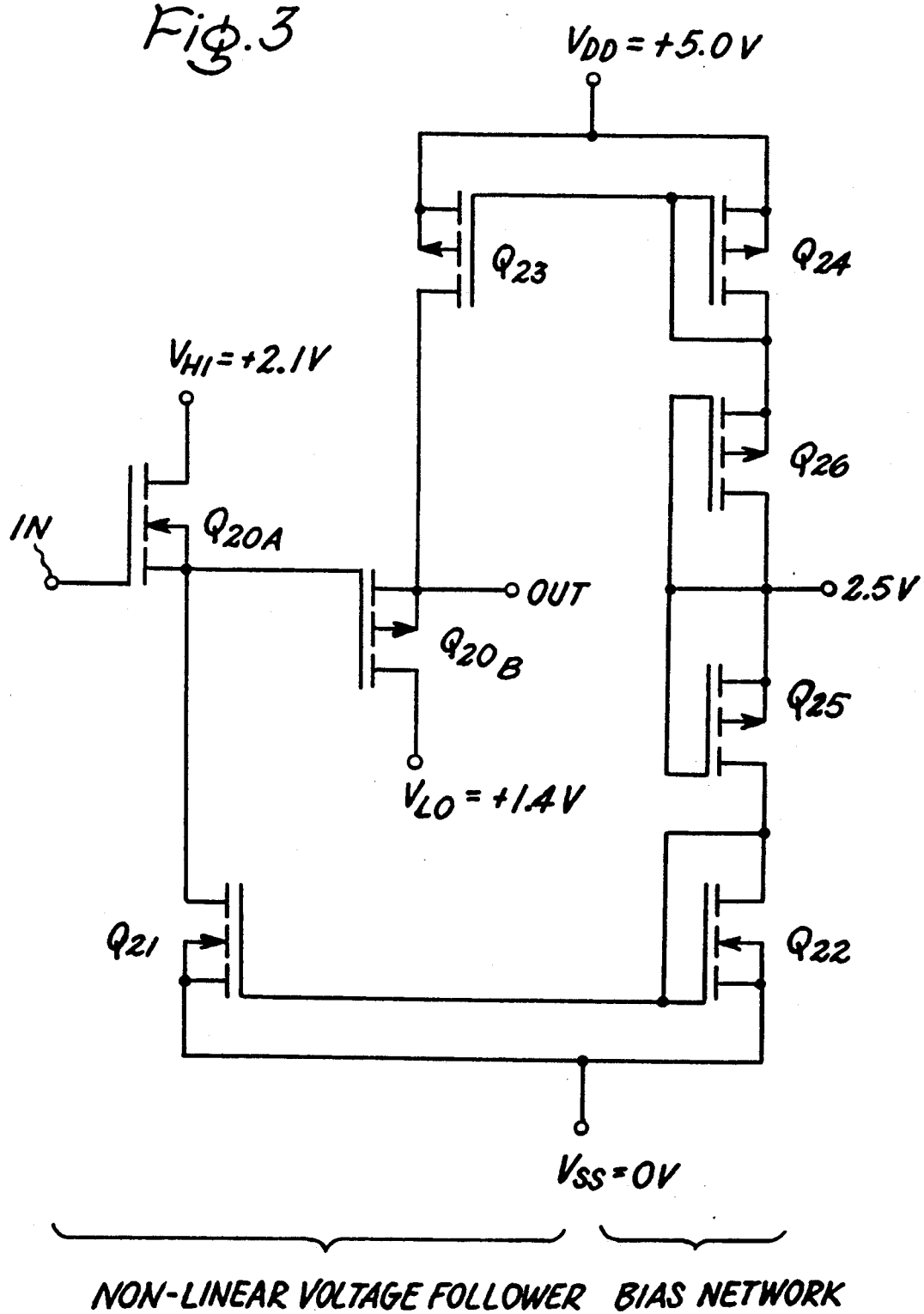
FIG. 3 is a schematic diagram of a non-linear voltage amplifier that is useful in the construction of neural nets in accordance with the invention.

FIG. 3 shows non-linear voltage amplifier circuitry that can be used after linear voltage amplifier circuitry to implement each non-linear output driver amplifier $OD_j$ in the FIG. 1 neural net layer. The FIG. 3 non-linear voltage amplifier is a cascade connection of two source-follower transistors, one ($Q_{20A}$) being an n-channel MOSFET and the other ($Q_{20B}$) being a p-channel MOSFET. $Q_{20A}$ is provided a constant-current generator source load by an n-channel MOSFET $Q_{21}$, which is the slave or output transistor of a current mirror amplifier including as its master or input transistor an n-channel MOSFET $Q_{22}$ self-biased by drain-to-gate feedback. $Q_{20B}$ is provided a constant-current generator source load by a p-channel MOSFET $Q_{23}$, which is the slave or output transistor of a current mirror amplifier including as its master or input transistor a p-channel MOSFET $Q_{24}$ self-biased by drain-to-gate feedback. $Q_{22}$ and $Q_{24}$ are connected as diodes by their respective drain-to-gate feedback connections, and these diodes are connected in series with another diode-connected n-channel MOSFET $Q_{25}$ and with another diode-connected p-channel MOSFET $Q_{26}$ between $V_{SS}$ and $V_{DD}$ potentials to implement a bias network. In this bias network a quiescent input current flows from the input port of the current mirror amplifier comprising $Q_{23}$, $Q_{24}$ into the input port of the current mirror amplifier comprising $Q_{21}$, $Q_{22}$. $Q_{21}$ and $Q_{23}$ drain current flows are similar-valued by current mirror amplifier action.

All the n-channel MOSFETs $Q_{20A}$, $Q_{21}$, $Q_{22}$ and $Q_{25}$ have similar channel widths and lengths and exhibit similar operating characteristics. All the p-channel MOSFETs $Q_{20B}$, $Q_{23}$, $Q_{24}$ and $Q_{26}$ have similar channel widths and lengths and exhibit similar operating characteristics, which are complementary to those of the n-channel MOSFETs. The bias network MOSFETs $Q_{22}$, $Q_{24}$, $Q_{25}$ and $Q_{26}$ may be shared by a plurality of the FIG. 3 non-linear voltage amplifier circuits, to conserve hardware and operating power.

Non-linearity of response in the FIG. 3 voltage amplifier comes about because (1) source-follower action of $Q_{20A}$ for positive-going excursions of its gate electrode potential becomes limited as its source potential approaches its drain potential $V_{HI}$ and (2) source-follower action of $Q_{20B}$ for negative-going excursions of its gate electrode potential becomes limited as its source potential approaches its drain potential $V_{LO}$. At the source electrode of source-follower $Q_{20B}$ there is a sigmoidal response to a linear ramp potential applied to the gate electrode of source-follower $Q_{20A}$. The voltages $V_{LO}$ and $V_{HI}$ can be programmed to control the limiting properties of the FIG. 3 non-linear amplifier, and the voltages $V_{LO}$ and $V_{HI}$ may be selected to provide for symmetry of response or for asymmetry of response. FIG. 3 shows representative values for $V_{HI}$ and $V_{LO}$ that provide a substantially symmetrical response about +2.5 volts.

Output driver amplifier $OD_j$ can use non-linear voltage amplifier circuitry different from that shown in FIG. 3. For example, source followers $Q_{20A}$ and $Q_{20B}$ can be reversed in order of their cascade connection. Either this alternative circuitry or the FIG. 3 circuitry can be preceded by a charge-sensing amplifier, rather than a linear voltage amplifier, to realize the type of output driver amplifier used in FIG. 4 and FIG. 9 neural nets. In the FIG. 1 neural net the output driver amplifiers can be realized without using the FIG. 3 circuitry or the previously described alternative circuitry. For example, each output driver amplifier can comprise a long-tailed pair connection of transistors having a current mirror amplifier load for converting their output signal voltage to single-ended form. The long-tailed pair connection of transistors is a differential amplifier connection where their source electrodes have a differential-mode connection to each other and to a constant-current generator.

Consider now how neuron model behavior is exhibited by input driver amplifier $ID_i$, capacitors $C_{i,j}$ and $C_{(i+M),j}$, and non-linear output driver amplifier $OD_j$ for particular respective values of i and j. The voltage responses input driver amplifier $ID_i$ applies to input lines $IL_i$ and $IL_{(i+M)}$ are the same in amplitude but are of opposing polarity as referred to a common-mode voltage that is designed to be nominally the same as a bias voltage $V_{BIAS}$ midway between the 0-volt $V_{SS}$ and +5-volt $V_{DD}$ supply voltages. If the capacitance of capacitor $C_{i,j}$ is larger than the capacitance of capacitor $C_{(i+M),j}$ for these particular values of i and j, then the output voltage $y_j$ for that j will exhibit "excitory" response to the input voltage $x_i$. If the capacitances of $C_{i,j}$ and $C_{(i+M),j}$ are equal for these i and j values, then the output voltage $y_j$ for that j should exhibit no response to the input voltage $y_j$. If the capacitance of capacitor $C_{i,j}$ is smaller than the capacitance of capacitor $C_{(i+M),j}$ for those i and j values, then the output voltage $y_j$ for that j will exhibit "inhibitory" response to the input voltage $x_i$.

In some neural nets constructed in accordance with the invention the capacitors $C_{i,j}$ and $C_{(i+M),j}$ for all i and j may be fixed-value capacitors, so there is never any alteration in the weighting of input voltages $x_i$ where $i = 1, \ldots M$. However, such neural nets lack the capacity to adapt to changing criteria for neural responses—which adaptation is necessary, for example, in a neural network that is to be connected for self-learning. It is desirable in certain applications, then, to provide for altering the capacitances of each pair of capacitors $C_{i,j}$ and $C_{(i+M),j}$ associated with a respective pair of values of i and j. This alteration is to be carried out in a complementary way, so the sum of the capacitances of $C_{i,j}$ and $C_{(i+M),j}$ remains equal to $C_k$. For example, this can be implemented along the lines of the inventor's previous teachings in regard to "digital" capacitors, having capacitances controlled in proportion to binary-numbers used as control signals, as particularly disclosed in connection with FIG. 11 of his U.S. Pat. No. 3,890,635 issued Jun. 17, 1975, entitled "VARIABLE CAPACITANCE SEMICONDUCTOR DEVICES" and assigned to General Electric Company. Each pair of capacitors $C_{i,j}$ and $C_{(i+M),j}$ is then two similar ones of these capacitors and their capacitances are controlled by respective control signals, one of which is the one's complement of the other.

Alternatively, the pair of capacitors $C_{i,j}$ and $C_{(i+M),j}$ may be formed from selecting each of a set of component capacitors with capacitances related in accordance with powers of two to be a component of one or the other of the pair of capacitors $C_{i,j}$ and $C_{(i+M),j}$, the selecting being done by field effect transistors operated as transmission gates. Yet another way of realizing the pair of capacitors $C_{i,j}$ and $C_{(i+M),j}$ is to control the inverted surface potentials of a pair of similar size metal-oxide-semiconductor capacitors with respective analog signals developed by digital-to-analog conversion.

FIG. 4, comprising component FIGS. 4A and 4B, shows a representative modification that can be made to the FIG. 1 neural net near each set of intersections of an output line $OL_j$ with input lines $IL_i$ and $IL_{(i+M)}$ driven by opposite senses of a synapse input signal $x_i$. Such modifications together make the neural net capable of being trained. Each capacitor pair $C_{i,j}$ and $C_{(i+M),j}$ of the FIG. 1 neural net is to be provided by a pair of digital capacitors $DC_{i,j}$ and $DC_{(i+M),j}$. (For example, each of these capacitors $DC_{i,j}$ and $DC_{(i+M),j}$ may be as shown in FIG. 11 of U.S. Pat. No. 3,890,635). The capacitances of $DC_{i,j}$ and $DC_{(i+M),j}$ are controlled in complementary ways by a digital word and its one's complement, as drawn from a respective word-storage element $WSE_{i,j}$ in an array of such elements located interstitially among the rows of digital capacitors and connected to form a memory. This memory may, for example, be a random access memory (RAM) with each word-storage element $WSE_{i,j}$ being selectively addressable by row and column address lines controlled by address decoders. Or, by way of further example, this memory can be a plurality of static shift registers, one for each column j. Each static shift register will then have a respective stage $WSE_{i,j}$ for storing the word that controls the capacitances of each pair of digital capacitors $DC_{i,j}$ and $DC_{(i+M),j}$.

The word stored in word storage element $WSE_{i,j}$ may also control the capacitances of a further pair of digital capacitors $DC_{i,(j+N)}$ and $DC_{(i+M),(j+N)}$, respectively. The capacitors $DC_{i,(j+N)}$ and $DC_{(i+M),(j+N)}$ connect between "ac ground" and input lines $IL_i$ and $IL_{(i+M)}$, respectively, and form parts of the loading capacitors $CL_i$ and $CL_{(i+M)}$, respectively. The capacitances of $DC_{(i+M),(j+N)}$ and $DC_{i,j}$ are similar to each other and changes in their respective values track each other. The four digital capacitors $DC_{i,j}$, $DC_{(i+M),j}$, $DC_{i,(j+N)}$ and $DC_{(i+M),(j+N)}$ are connected in a bridge configuration having input terminals to which the input lines $IL_i$ and $IL_{(i+M)}$ respectively connect and having output terminals connecting to output line $OL_j$ and to ac ground respectively. The capacitances of $DC_{i,(j+N)}$ and $DC_{(i+M),j}$ are similar to each other and changes in their respective values track each other. This bridge configuration facilitates making computations associated with back-propagation programming by helping make the capacitance network bilateral insofar as voltage gain is concerned. Alternatively, where the computations for back-propagation programming are done by computers that do not involve the neural net in the computation procedures, the neural net need not include the digital capacitors $DC_{i,j+N}$ and $DC_{(i+M),(j+N)}$. These digital capacitors $DC_{i,(j+N)}$ and $DC_{(I+M),(j+N)}$ are not needed either where very large loading capacitors are placed on the output lines $OL_j$, but this alternative undesirably reduces sensitivity of the output driver amplifier $OD_j$.

When the FIG. 4 neural net is being operated normally, following programming, the $\phi_P$ signal applied to a mode control line MCL, is a logic ZERO. This ZERO conditions a respective input line multiplexer $ILM_i$ to connect the non-inverting output port at each input driver amplifier $ID_i$ to input line $IL_i$. The $\phi_P$ signal on mode control line MCL being a ZERO also conditions a respective input line multiplexer $ILM_{(i+M)}$ to connect the inverting output port of each input driver amplifier $ID_i$ to input line $IL_{(i+M)}$.

A ZERO on mode control line MCL also conditions each output line multiplexer $OLM_j$ of an n-numbered plurality thereof to select the output line $OL_j$ to the inverting input terminal of a respective associated differential-input amplifier $DA_j$, included in a respective charge-sensing amplifier $QS_j$ that performs a charge-sensing operation for output line $OL_j$. In furtherance of this charge-sensing operation, a transmission gate $TG_j$ responds to the absence of a reset pulse $Q_R$ to connect an integrating capacitor $CI_j$ between the output and inverting-input terminals of differential-input amplifier $DA_j$. Amplifier $DA_j$ may be an operational amplifier of the conventional voltage amplifier type or may be an operational transconductance amplifier. With integrating capacitor $CI_j$ so connected, amplifier $DA_j$ functions as a charge amplifier. When $\phi_P$ signal on mode control line MCL is a ZERO, the input signal $x_i$ induces a total change in charge on the capacitors $DC_{i,j}$ and $DC_{(i+M),j}$ proportional to the difference in their respective capacitances. The resulting displacement current flow from the inverting input terminal of differential-input amplifier $DA_j$ requires that there be a corresponding displacement current flow from the integrating capacitor $CI_j$ charging that capacitor to place thereon a voltage $v_j$ defined as follows.

$$v_j = (CI_j)^{-1} \sum_{i=1}^{M} (C_{i,j} - C_{(i+M),j}) x_i \quad (11)$$

The voltage $V_j$ is supplied to a non-linear voltage amplifier circuit $NL_j$, which can be the non-linear voltage amplifier circuit of FIG. 3 or an alternative circuit as previously described. The non-linear voltage amplifier circuit responds to generate the axon output response $Y_j$.

From time to time, the normal operation of the neural net is interrupted, and to implement dc-restoration a reset pulse $\phi_R$ is supplied to each charge sensing amplifier $QS_j$. Responsive to $\overline{\phi_R}$ the logic compliment of the reset pulse $\phi_R$, going low when $\phi_R$ goes high, transmission gate $TG_j$ is no longer rendered conductive to connect the integrating capacitor $CI_j$ from the output terminal of differential amplifier $DA_j$. Instead, a transmission gate $TG_{(j+N)}$ responds to $\phi_R$ going high to connect to $V_{BIAS}$ the plate of capacitor $C_j$ normally connected from that output terminal, $V_{BIAS}$ being the 2.5 volt intermediate potential between the $V_{ss}=0$ volt and $V_{DD}=5$ volt operating voltages of differential amplifier $DA_j$. Another transmission gate $TG_{(j+2N)}$ responds to $\phi_R$ going high to apply direct-coupled feedback from the output terminal of differential amplifier $DA_j$ to its inverting input terminal, to bring the voltage at the output terminal to that supplied to its inverting input terminal from output line $OL_j$. During the dc-restoration all $x_i$ are "zero-valued". So, the charge on integrating capacitor $CI_j$ is adjusted to compensate for any direct voltage error occurring in the circuitry up to the output terminal of differential amplifier $DA_j$. DC-restoration is done concurrently for all differential amplifiers $DA_j$ (i.e., for values of j ranging from one to N).

During training, the $\phi_P$ signal applied to mode control line MCL is a logic ONE, which causes the output line multiplexer $OLM_j$ to disconnect the output line $OL_j$ from the inverting input terminal of differential amplifier $DA_j$ and to connect the output line $OL_j$ to receive a $\delta_j$ error term. This $\delta_j$ error term is generated as the product output signal of a analog multiplier $AM_j$, responsive to a signal $\Delta_j$ and to a signal $y'_j$ which is the change in output voltage $y_j$ of non-linear amplifier $NL_j$ for unit change in the voltage on output line $OL_j$. The term $\Delta_j$ is for the output neural net layer the difference between $y_j$ actual value and its desired value $d_j$. The term $\Delta_j$ is for a hidden neural net layer the $\Delta_j$ output of the succeeding neural net layer during the back-propagation procedure.

Differentiator $DF_j$ generates the signal $y'_j$, which is a derivative indicative of the slope of $y_j$ change in voltage on output line $OL_j$, superposed on $V_{BIAS}$. To determine the $y'_j$ derivative, a pulse doublet comprising a small positive-going pulse immediately followed by a similar-amplitude negative-going pulse is introduced at the inverting input terminal of differential amplifier $DA_j$ (or equivalently, the opposite-polarity doublet pulse is introduced at the non-inverting input terminal of differential amplifier $DA_j$) to first lower $y_j$ slightly below normal value and then raise it slightly above normal value. This transition of $y_j$ from slightly below normal value to slightly above normal value is applied via a differentiating capacitor $CD_j$ to differentiator $DF_j$.

Differentiator $DF_j$ includes a charge sensing amplifier including a differential amplifier $DA_{(j+N)}$ and an integrating capacitor $CI_{(j+N)}$. During the time that $y_j$ is slightly below normal value, a reset pulse $\phi_S$ is applied to transmission gates $TG_{(j+4N)}$ and $TG_{(j+5N)}$ to render them conductive. This is done to drain charge from integrating capacitor $CI_{(J+N)}$, except for that charge needed to compensate for $DA_{(j+N)}$ input offset voltage error. The reset pulse $\phi_S$ ends, rendering transmission gates $TGB_{(j+4N)}$ and $TG_{(j+5N)}$ no longer conductive, and the complementary signal $\overline{\phi_S}$ goes high to render a transmission gate $TG_{(j+3N)}$ conductive for connecting integrating capacitor $CI_{(j+N)}$ between the output and inverting-input terminals of differential amplifier $DA_{(j+N)}$.

With the charge sensing amplifier comprising elements $DA_{(j+N)}$ and $CI_{(j+N)}$ reset, the small downward pulsing of $y_j$ from normal value is discontinued and the small upward pulsing of $y_j$ from normal value occurs. The transition between the two abnormal conditions of $y_j$ is applied to the charge sensing amplifier by electrostatic induction via differentiating capacitor $CD_j$. Differential amplifier $DA_{(j+N)}$ output voltage changes by an amount $y'_j$ from the $V_{BIAS}$ value it assumed during reset. The use of the transition between the two pulses of the doublet, rather than the edge of a singlet pulse, to determine the derivative $y'_j$ makes the derivative-taking process treat more similarly those excitory and inhibiting responses of the same amplitude. The doublet pulse introduces no direct potential offset error into the neural net layer.

Responsive to a pulse $\phi_T$, the value $y'_j+V_{BIAS}$ from differentiator $DF_j$ is sampled and held by (row) sample and hold circuit $RSH_j$ for application to analog multiplier $AM_j$ as an input signal. This sample and hold procedure allows $y_j$ to return to its normal value, which is useful in the output layer to facilitate providing $y_j$ for calculating $(y_j-d_j)$. The sample and hold circuit $RSH_j$ may simply comprise an L-section with a series-arm transmission-gate sample switch and a shunt-leg hold capaicitor, for example. Analog multiplier $AM_j$ is of a type accepting differential input signals—e.g., as described by K. Bullt and H. Wallinga in their paper "A CMOS Four-quadrant Analog Multiplier" appearing on pages 430-435 of the *IEEE JOURNAL OF SOLID STATE CIRCUITS*, Vol. SO-21, No. 3, June 1986, incorporated herein by reference. The difference between $V_j+V_{BIAS}$ and $V_{BIAS}$ voltages is used as a differential input signal to analog multiplier $AM_j$, which exhibits common-mode rejection for the $V_{BIAS}$ term.

During training, the $\phi_p$ signal applied to the mode control line MCL is a ONE, as previously noted, and this causes the input line multiplexers $ILM_i$ and $ILM_{(i+M)}$ to disconnect the input lines $IL_i$ and $IL_{(i+M)}$ from the input driver amplifier $ID_i$ output terminals and connect them instead to the non-inverting and inverting input terminals of a differential charge-sensing amplifier $DQS_i$. The voltage $\delta_j$ induces a differential change in charge between input lines $IL_j$ and $IL_{(i+M)}$ proportional to $\delta_j$ $(C_{i,j}-C_{(i+M),j})$, which differential change in charge is sensed using the differential charge sensing amplifier $DQS_i$.

Differential charge-sensing amplifier $DQS_i$ includes a fully differential amplifier (as shown in FIG. 2, for example) provided with integrating capacitors $IC_i$ and $IC_{(i+M)}$ in respective degenerative feedback connections from each of its output terminals to each of its input terminals. Resetting of differential charge-sensing amplifier $DQS_i$ is similar to the resetting of a single-ended amplifier such as $QS_j$, except for involving two integrating capacitors $IC_i$ and $IC_{(i+m)}$, rather than just the one integrating capacitor $CI_j$. Resetting of differential charge-sensing amplifier $DQS_i$ is done responsive to a pulse $\phi_U$, which occurs during the time when mode control line MCL has a ONE thereon conditioning input line multiplexers $ILM_i$ and $IM_{(i+m)}$ to connect input lines $IL_i$ and $IL_{(i+m)}$ differential charge-sensing amplifier $DQS_i$. Resetting is normally done shortly after a ZERO to ONE transition appears in the $\phi_p$ signal applied to mode control line MCL and may also be done at other times. This procedure corrects for capacitive unbalances on the input lines $IL_i$ and $IL_{(i+M)}$ during back-propagation computations that follow the resetting procedure. In these computations voltages $+\Delta_i+V_{BIAS}$ and $-\Delta_iV_{BIAS}$ are developed at the (+) and (−) output terminals of the fully differential amplifier included in differential charge-sensing amplifier $DQS_i$. The voltage $+\Delta_i+V_{BIAS}$ is used by the preceding neural net layer during the back-propagation training procedure, if such a preceding neural net layer exists. The use of single-ended $+\Delta_i$ and $+\Delta_j$ drive is shown in FIG. 4, presuming the neural net layers to be integrated within separate monolithic integrated circuits, and presuming the limitation on number of pin-outs is restrictive. Where a plurality of neural net layers are integrated within the same monolithic integrated circuitry, or where maximum pin-out count is not a restrictive design factor, balanced $\Delta$ signals may be applied from one neural net layer to the preceding one. So, too, if the non-linear voltage amlifier $NL_j$ is of a correct type (for example, a long-tailed pair connection of transistors) $y_j+V_{BIAS}$ and $-y_j+V_{BIAS}$ balanced output signals may be supplied to the next neural net layer. Indeed, the $y'_j$ signals applied to the analog multiplier $AM_j$ may be generated in balanced form, replacing differentiator $DF_j$ and sample-and-hold circuit $SH_j$ with balanced circuitry.

FIG. 5 shows how each output line $OL_j$ for $j=1, \ldots N$ may be pulsed during calculation of $y'_j$ terms. Each output line $OL_j$ is connected by a respective capacitor $CO_j$ to the output terminal of a pulse generator PG, which generates the doublet pulse. FIG. 5 shows the doublet pulse applied to the end of each output line $OL_j$ remote from the −terminal of the associated differential amplifier $DA_j$ in the charge-sensing amplifier $QS_j$ sensing the charge on that line. It is also possible to apply the doublet pulses more directly to those (−) terminals by connecting to these terminals respective ones of the plates of capacitors $CO_j$ that are remote from the plates connecting to pulse generator PG.

FIG. 6 shows how the non-inverting (+) input terminal of each differential amplifier $DA_j$ may be pulsed during calculation of $y'_j$ terms, rather than pulsing the $OL_j$ output lines. $V_{BIAS}$, rather than being applied directly to the non-inverting input terminals of each differential amplifier $DA_j$, is applied from the output terminal of a biasing operational amplifier BOA. Operational amplifier BOA has its non-inverting terminal connected to receive $V_{BIAS}$, and has degenerative feedback applied via a resistor R1 from its output terminal to its inverting input terminal. This degenerative feed holds the quiescent level of operational amplifier BOA output terminal at $V_{BIAS}$. A pulse generator PG applies a doublet pulse via the series connection of a resistor R2 having resistance and a dc-blocking capacitor CB to the inverting input terminal of operational amplifier BOA. Presuming the resistances of resistors R1 and R2 to be $R_1$ and $R_2$, respectively, a doublet pulse $-R_1/R_2$ times the amplitude of the doublet pulse supplied from the pulse generator PG is applied from the output terminal of operational amplifier DBA to the non-inverting input terminals of differential amplifiers $DA_j$. This doublet pulse, having no direct voltage component, does not alter the $V_{BIAS}$ direct component maintained at the output terminal of operational amplifier BOA by the degenerative feedback connection back to the inverting input connection of BOA.

Arrangements for adding the doublet pulse to $v_j$ before its application to the non-linear amplifier $NL_j$ can be used, rather than using the FIG. 5 or FIG. 6 arrangement.

FIG. 7 shows apparatuses for completing the back-propagation computations, as may be used with the FIG. 1 neural net manifoldly modified per FIG. 4. The weights at each word storage element $WSE_{i,j}$ in the interstitial memory array IMA are to be adjusted as the i column addresses and j row addresses are scanned row by row, one column at a time. An address scanning generator ASG generates this scan of i and j addresses shown applied to interstitial memory array IMA, assuming it to be a random access memory. The row address j is applied to a row multiplexer RM that selects $\delta_j$ to one input of a multiplier MULT, and the column address i is applied to a column multiplexer CM that selects $x_i$ to another input of the multiplier MULT.

Multiplier MULT is of a type providing a digital output responsive to the product of its analog input signals. Multiplier MULT may be a multiplying analog-to-digital converter, or it may comprise an analog multiplier followed by an analog-to-digital converter, or it may comprise an analog-to-digital converter for each of its input signals and a digital multiplier for multiplying together the converted signals. Multiplier MULT generates the product $x_i \delta_j$ as reduced by a scaling factor $\eta$, which is the increment or decrement to the weight stored in the currently addressed word storage element $WSE_{ij}$ in the memory array IMA. The former value of weight stored in word storage element $WSE_{ij}$ is read from memory array IMA to a temporary storage element, or latch, TS. This former weight value is supplied as minuend to a digital subtractor SUB, which receives as subtrahend $\eta\, x_i \delta_j$ from multiplier MULT. The resulting difference is the updated weight value, which is written into word storage element $WSE_{i,j}$ in memory array IMA to replace the former weight value.

FIG. 8 shows how trained neural net layers $L_0$, $L_1$ and $L_2$ are connected together in a system that can be trained. $L_0$ is the output neural net layer that generates $Y_j$ output signals, is similar to that described in connection with FIGS. 4 and 5, and is provided with a back-propagation processor $BPP_0$ with elements similar to those shown in FIG. 6 for updating the weights stored in the interstitial memory array of $L_0$. $L_1$ is the first hidden neural net layer which generates $y_i$ output signals supplied to the output neural net layer as its $x_i$ input signals. These $y_i$ output signals are generated by layer $L_1$ as its non-linear response to the weighted sum of its $x_h$ input signals. This first hidden neural net layer $L_1$ is provided with a back-propagation processor $BPP_1$ similar to $BPP_0$. $L_2$ is the second hidden neural net layer, which generates $y_h$ output signals supplied to the first hidden neural net layer as its $x_h$ input signals. These $y_h$ output signals are generated by layer $L_2$ as its non-linear response to a weighted summation of its $x_g$ input signals. This second hidden layer is provided with a back-propagation processor similar to $BPP_0$ and to $BPP_1$.

FIG. 8 presumes that the respective interstitial memory array IMA of each neural net layer $L_0$, $L_1$, $L_2$ has a combined read/write bus instead of separate read input and write output busses as shown in FIG. 7. Back-propagation processor $BPP_0$ modifies the weights read from word storage elements in neural net layer $L_0$ interstitial memory array by $\eta\, x_i \delta_j$ amounts and writes them back to the word storage elements in a sequence of read-modify-write cycles during the training procedure. Back-propagation processor $BPP_1$ modifies the weights read from word storage elements in neural net layer $L_1$ interstitial memory array by $\eta\, x_h \delta_i$ amounts and writes them back to the word storage elements in a sequence of read-modify-write cycles, during the training procedure. Back-propagation processor $BPP_2$ modifies the weights read and storage elements in neural net layer $L_2$ interstitial memory array by $\eta\, x_g \delta_h$ amounts and writes them back to the word storage element in a sequence of read-modify-write cycles during the training procedure.

FIG. 9, comprising component FIGS. 9A and 9B shows an alternative modification that can be manifoldly made to the FIG. 1 neural net layer to give it training capability. This alternative modification seeks to avoid the need for a high-resolution multiplier MULT and complex addressing during back-propagation calculations in order that training can be implemented. A respective up/down counter $UDC_{i,j}$ is used instead of each word storage element $WSE_{i,j}$. Correction of the word stored in counter $UDC_{i,j}$ is done a count at a time; and the counter preferably has at least one higher resolution stage in addition to those used to control the capacitances of digital capacitors $DC_{i,j}$, $DC_{(i+M),j}$, $DC_{i,(j+N)}$ and $DC_{(i+M),(j+N)}$. Each up/down counter $UDC_{i,j}$ has a respective counter control circuit $CON_{i,j}$ associated therewith. Each counter control circuit $CON_{i,j}$ may, as shown in FIG. 9a, and described in detail further on in this specification simply consist of an exclusive-OR gate $XOR_{i,j}$.

A row sign detector $RSD_j$ detects whether the polarity of $\delta_j$ is positive or negative, indicative of whether a row of weights should in general be decremented or incremented, and broadcasts its detection result via a row sign line $RSL_j$ to all counter control circuits ($CON_{i,j}$ for $i=1, \ldots, M$) in the row j associated with that row sign detector $RSD_j$. Before making a back-propagation calculation, a respective column sign detector $CSD_i$ detects whether the polarity of $x_i$ is positive or negative for each columnar position along the row which is to be updated, to provide an indication of whether it is likely the associated weight should be decremented or incremented. This indication is stored temporarily in a (column) sample and hold circuit $CSH_i$. Each column sample and hold circuit $CSH_i$ is connected to broadcast its estimate via a column sign line $CSL_i$ to all counter control circuits ($CON_{i,j}$ for $j=1, \ldots N$) in the column i associated with that sample and hold circuit $CSH_i$. Responsive to these indications from sign detectors $CSD_i$ and $RSD_j$, each respective counter control circuit $CON_{i,j}$ decides in which direction up/down counter $UDC_{i,j}$ will count to adjust the weight control signals $D_{i,j}$ and $\overline{D}_{i,j}$ stored therein The counter control circuitry $CON_{i,j}$ should respond to the sign of $+\delta_j$ being positive, indicating the response $v_j$ to be too positive, to decrease the capacitance to output line $OL_j$ that is associated with the signal $x_i$ or $-x_i$ that is positive and to increase the capacitance to output line $OL_j$ that is associated with the signal $-x_i$ or $x_i$ that is negative, for each value of i. The counter control circuitry $CON_{i,j}$ should respond to the sign of $+\delta_j$ being negative, indicating the response v to be too negative, to increase the capacitance to output line $OL_j$ that is associated with the signal $-x_i$ or $x_i$ that is negative and to decrease the capacitance to output line $OL_j$ that is associated with the signal $x_i$ or $-x_i$ that is positive. Accordingly, counter control circuitry $CON_{i,j}$ may simply consist of a respective exclusive-OR gate $XOR_{i,j}$ as shown in FIG. 9a, if the following presumptions are valid.

Each of the digital capacitors $DC_{i,j}$ and $DC_{(i+M),(j+N)}$ is presumed to increase or decrease its capacitance as $D_{i,j}$ is increased or decreased respectively. Each of the digital capacitors $DC_{(i+M),j}$ and $DC_{i,(j+N)}$ is presumed to increase or decrease its capacitance as $\overline{D}_{i,j}$ is increased or decreased respectively. A ZERO applied as up/down signal to up/down counter $UDC_{i,j}$ is presumed to cause counting down for $D_{i,j}$ and counting up for $\overline{D}_{i,j}$. A ONE applied as up/down signal to up/down counter $UDC_{i,j}$ is presumed to cause counting up for $D_{i,j}$ and counting down for $D_{i,j}$. Column sign detector $CSD_i$ output indication is presumed to be a ZERO when $x_i$ is not negative and to be a ONE when $x_i$ is negative. Row sign detector RSD$_j$ output indication is presumed to be a ZERO when $\delta_j$ is not negative and to be a ONE when $\delta_j$ is negative. Since the condition where $x_i$ or $\delta_j$ is zero-valued is treated as if the zero-valued number were positive, forcing a false correction which is in fact not necessary, and thus usually creating the need for a counter correction in the next cycle of back-propagation training, there is dither in the correction loops. However, the extra stage or stages of resolution in each up/down counter UDC$_{i,j}$ prevent high-resolution dither in the feedback correction loop affecting the capacitances of DC$_{i,j}$, DC$_{(i+M),j}$, DC$_{i,(j+N)}$ and DC$_{(i+M),(j+N)}$.

Analog multiplier AM$_j$ can be readily modified to develop its product output in balanced form. The Bult and Wallinga analog multiplier initially develops its product in balanced form and follows this with a push-pull to single-ended converter connection using current mirror multipliers. An additional balanced to single-ended converter can convert the push-pull product to opposite-sense output signal. With an analog multiplier generating balanced product signals, the $+\delta_j$ and $-\delta_j$ terms can be supplied to a voltage comparator that serves as the row sign detector RSD$_j$. Alternatively, since the derivative $y'_j$ always has the same sign (normally a positive one), one can use a voltage comparator to compare the voltages supplied to the asterisked and double-asterisked input terminals of the analog multiplier AM$_j$, for providing the row sign detector RSD$_j$.

FIG. 10 shows the construction of counter UDC$_{i,j}$ being one that has a plurality of binary counter stages BCS$_1$, BCS$_2$, BCS$_3$ that provide increasingly more significant bits of the weight control signal D$_{i,j}$ and of its one's complement $\overline{D}_{i,j}$. FIG. 11 shows the logic within each binary counter stage which is implemented with MOS circuitry that is conventional in the art. FIGS. 10 and 11 make it clear that the opposite directions of counting for D$_{i,j}$ and $\overline{D}_{i,j}$ can be controlled responsive to a ZERO or ONE up/down control signal in either of two ways, depending on whether D$_{i,j}$ is taken from $\overline{Q}$ outputs of the flip-flops and $\overline{D}_{i,j}$ is taken from their Q outputs, as shown, or whether D$_{i,j}$ is taken from the Q outputs of the flip-flops and $\overline{D}_{i,j}$ is taken from their $\overline{Q}$ outputs. If the latter choice had been made instead, each counter control circuit CON$_{i,j}$ would have to consist of a respective exclusive-NOR circuit, or alternatively the CSD$_i$ and RSD$_j$ sign detectors would have to be of opposite logic types, rather than of the same logic type.

FIG. 12 shows a further modification that can be made to the FIG. 1 neural net layer modified per FIG. 9. Input driver amplifier ID$_i$ is time-division-multiplexed in duplex circuitry DPX$_i$ for performing the function of the differential charge-sensing amplifier DQS in FIG. 9a. Only one set of interconnecting lines is used between neural net layers, both for conducting $x_i + V_{BIAS}$ signals to a neural net layer during forward-propagation when $\phi_P$ is ZERO and for conducting $\Delta_i + V_{BIAS}$ signals from that neural net layer during back-propagation when $\phi_P$ is ONE. An input multiplexer IMI$_i$ controlled from the $\phi_P$, which is signal on the mode control line MCL, performs the time-division-multiplexing for the neural net layer including input driver amplifier ID$_i$. An output multiplexer OM$_i$ for the preceding neural net layer controlled from the $\phi_P$ signal in its mode controlling MCL' selects $y_i + V_{BIAS}$ to the interconnecting line between the layers during forward propagation when $\phi_P$ is ZERO, and selects $\Delta_i + V_{BIAS}$ from that interconnecting line during back-propagation when $\phi_P$ is ONE.

Similar further modification can be made to the FIG. 1 neural net layer modified per FIG. 4. In such case column sign detector CSD$_i$ column sample and hold circuit CSH$_i$, and column sign line CSL$_i$ would, of course, not be used.

The time-division-multiplexed use of the input driver amplifiers ID$_i$ saves integrated-circuit die area. The conservation of interconnecting lines between successive neural net layers is of substantial importance, since pin-out limitations on interconnected integrated circuits having different neural net layers therein are less restrictive of neural net layer size. A neural net layer with twice as many inputs and outputs can be constructed within an integrated circuit having given pin-out limitations.

The multiplexers employed in various portions of the circuits described above are customarily constructed of single-pole switch elements, each of which single-pole switch elements is conventionally a so-called "transmission gate" connection of one or more field effect transistors in CMOS design. A suitable transmission gate is provided by the paralleled channels of a p-channel FET and an n-channel FET having oppositely swinging control voltages applied to their respective gate electrode to control the selective conduction of those paralleled channels.

One skilled in the art and acquainted with the foregoing specification will be able to design numerous variants of the preferred embodiments described therein, and this should be borne in mind when construing the following claims.

What is claimed is:

1. A processor for providing a response to a plurality of input signal voltages, said processor comprising:
    an output line on which a weighted summation of said input signal voltages appears;
    an amplifier having an input port to which said output line connects and having an output port at which said response is provided;
    a plurality, 2M in number, of input lines respectively identified by consecutive ordinal numbers first through 2M$^{th}$, M being a positive integer;
    a plurality, 2M in number, of capacitive elements, each exhibiting a respective capacitance including at least a respective stray capacitance component, each said capacitive element connecting a respective one of said input lines to said output line, and being identified by the same ordinal number as the input line it connects to said output line;
    means for referring said output line to a reference voltage during dc-restoration periods interspersed among times of normal operation;
    means for applying voltages associated with zero-valued first through M$^{th}$ input signal voltages to said first through M$^{th}$ input lines during said dc-restoration periods;
    means for applying voltages associated with zero-valued first through M$^{th}$ input signal voltages to said (M+1)$^{th}$ through 2M$^{th}$ input lines during said dc-restoration periods; and
    means for applying M input signal voltages in balanced form each to a respective pair of said input lines, identified by ordinal numbers M apart, so that said input lines in each respective pair simultaneously differ from the respective voltages applied to them during said dc-restoration periods by voltages of the same amplitude and opposite polarity; the difference in the capacitances of the capacitive elements connecting to said output line from said pair of input lines determining the weighting of the input signal applied in balanced form on that said pair of input lines, as appears in said weighted summation of input signals.

2. A plurality, N in number, of processors of the type set forth in claim 1, respectively identified by respective consecutive ordinal numbers first through $N^{th}$, N being a positive integer, said first through $N^{th}$ processors having each set of their input lines that are identified by the same ordinal number connected to be receptive of the same input signal, thereby to provide a neural network layer.

3. A processor as set forth in claim 1 wherein said amplifier is of a type that includes a charge-sensing amplifier for sensing the charge appearing on said output line during said times of normal operation, which said charge-sensing amplifier includes:
   a differential-input amplifier having an output terminal, having an inverting input terminal to which said output line connects, and having a non-inverting input terminal to which said reference voltage is applied;
   an integrating capacitive element having a first plate connected to the inverting input terminal of said differential-input amplifier and having a second plate;
   means for connecting the output terminal of said differential-input amplifier to the second plate of said integrating capacitive element during said times of normal operation;
   means for applying said reference voltage to the second plate of said integrating capacitive element during portions of said do-restoration periods; and
   means for establishing a conductive path from the output terminal of said differential-input amplifier to the inverting input terminal of said differential-input amplifier during portions of said dc-restoration periods when said reference voltage is applied to the second plate of said integrating capacitive element.

4. A processor as set forth in claim 1 wherein the capacitances of each pair of said capacitive elements having respective ordinal numbers different by M add together to a same prescribed value.

5. A processor as set forth in claim 4 wherein each of said capacitive elements is a respective digital capacitor having a structure equivalent to the structure of each of the others, each said digital capacitor having a capacitance that is programmed by a respective binary number programming signal and that is altered responsive to a change in said respective binary number programming signal.

6. A processor for providing an "axon" response to a plurality of "synapse" input signal voltages, said processor comprising:
   an output line on which a weighted summation of said input signal voltages appears;
   a non-linear amplifier having an input port to which said output line connects and having an output port at which said "axon" response is provided, said non-linear amplifier exhibiting sigmoidal non-linearity in its response characteristic said sigmoidal response characteristic having a portion of response characteristic with maximum or close-to-maximum sensitivity between portions of response characteristic with substantially-less-than-maximum sensitivity;
   a plurality, 2M in number, of input lines respectively identified by consecutive ordinal numbers first through $2M^{th}$, M being a positive integer;
   a plurality, 2M in number, of capacitive elements, each exhibiting a respective capacitance including at least a respective stray capacitance component, each said capacitive element connecting a respective one of said input lines to said output line, and being identified by the same ordinal number as the input line it connects to said output line; and
   means for applying M input signal voltages in balanced form each to a respective pair of said input lines, identified by ordinal numbers M apart, the difference in the capacitances of the capacitive elements connecting to said output line from said pair of input lines determining the weighting of the input signal applied in balanced form on that said pair of input lines, as appears in said weighted summation of input signals, whereby the effects of said stray capacitances on said weighted summation of said input signals is reduced—said processor including the improvement wherein said means for applying M input signal voltages is of a type for applying said signal voltages in balanced form at levels such as to cause, responsive to certain combinations of said M input signal voltages all within their ordinary ranges, said non-linear amplifier to operate in a portion of its sigmoidal response characteristic having substantially-less-than-maximum sensitivity.

7. A processor for providing an "axon" response to a plurality of "synapse" input signal voltages, said processor comprising:
   an output line on which a weighted summation of said input signal voltages appears;
   a plurality, 2M in number, of input lines respectively identified by consecutive ordinal numbers first through $2M^{th}$, M being a positive integer;
   a plurality, 2M in number, of capacitive elements, each exhibiting a respective capacitance including at least a respective stray capacitance component, each said capacitive element connecting a respective one of said input lines to said output line, and being identified by the same ordinal number as the input line it connects to said output line;
   means for referring said output line to a reference voltage during dc-restoration periods interpersed among times of normal operation;
   means for applying voltages associated with zero-valued first through $M^{th}$ input signal voltages to said first through $M^{th}$ input lines during said dc-restoration periods;
   means for applying voltages associated with zero-valued first through $M^{th}$ input signal voltages to said $(M+1)^{th}$ through $2M^{th}$ input lines during said dc-restoration periods;
   means for applying M input signal voltages in balanced form each to a respective pair of said input lines, identified by ordinal numbers M apart, the difference in the capacitances of the capacitive elements connecting to said output line from said pair of input lines determining the weighting of the input signal applied in balanced form on that said pair of input lines, as appears in said weighted summation of input signals, whereby the effects of said stray capacitances on said weighted summation of said input signals is reduced;

a charge-sensing amplifier having an input port to which said output line connects and having an output port, said charge-sensing amplifier being of a type maintaining a prescribed value of voltage on said output line irrespective of the value of said weighted summation of said input signals; and means for providing, as said "axon" response, a non-linear voltage response to voltage appearing at the output port of said charge-sensing amplifier.

8. A neural network having a plurality, L in number, of neural net layers respectively identified by consecutive ordinal numbers zeroeth through $(L-1)^{th}$, L being a positive integer at least two, each said neural net layer including:

a respective plurality, 2M in number, of input lines respectively identified by consecutive ordinal numbers first through $2M^{th}$, the respective M for each neural net layer being a positive integer at least two;

means for applying M input signal voltages in balanced form each to a respective pair of said input lines, identified by ordinal numbers M apart; and a respective plurality, N in number, of processors respectively identified by respective consecutive ordinal numbers first through $N^{th}$, the respective N for each neural net layer being a positive integer at least two, each said processor comprising:

a respective output line;

a respective non-linear amplifier having an input port to which said respective output line connects and having an output port at which a respective output signal is provided, the non-linear amplifiers of the processors in each of said neural net layers after the zeroeth supplying their output signals to determine the input signal voltages of respective processors in neural net layers of lower ordinal numbering, each said non-linear amplifier exhibiting a sigmoidal non-linear response characteristic having a portion of response characteristic with maximum or close-to-maximum sensitivity between portions of response characteristic with substantially-less-than-maximum sensitivity; and a plurality, 2N in number, of capacitive elements, each exhibiting a respective capacitance including at least a respective stray capacitance component, each said capacitive element connecting to said output line a respective one of said input lines of that said neural net layer as includes that said processor, and being identified by the same ordinal number as the input line it connects to said respective output line, the difference in the capacitances of the capacitive elements connecting to said output line from each said pair of input lines determining the weighting of the input signal applied in balanced form on that said pair of input lines as appears on said output line—said neural network including the improvement wherein in each said neural net layer said means for applying M input signal voltages in balanced form each to a respective pair of said input lines includes:

means for applying said signal voltages in balanced form at levels such as to cause, responsive to certain combinations of said M input signal voltages all within their ordinary ranges, certain ones of said non-linear amplifiers in said processors in said neural net layer each to operate in a portion of its sigmoidal response characteristic having substantially-less-than-maximum sensitivity.

9. A processor for providing an "axon" response to a plurality of "synapse" input signal voltages, said processor comprising:

an output line on which a weighted summation of said input signal voltages appears;

a non-linear amplifier having an input port to which said output line connects and having an output port from which a non-linear response to said weighted summation of said input signal voltages is provided, which non-linear response corresponds to said "axon" response;

a plurality, 2M in number, of input lines respectively identified by consecutive ordinal numbers first through $2M^{th}$, M being a positive integer;

a plurality, 2M in number, of capacitive elements, each of said capacitive elements being a respective digital capacitor of the same type as each of the others, each said digital capacitor having a respective capacitance that is programmed by a respective binary number programming signal, its respective capacitance including at least a respective stray capacitance component, each said capacitive element connecting a respective one of said input lines to said output line and being identified by the same ordinal number as the input line it connects to said output line, the capacitances of each pair of said capacitive elements having respective ordinal numbers different by M adding together to a same prescribed value;

means for applying M "synapse" input signal voltages in balanced form each to a respective pair of said input lines, identified by ordinal numbers M apart, the difference in the capacitances of the capacitive elements connecting to said output line from said pair of input lines determining the weighting of the input signal applied in balanced form on that said pair of input lines, as appears in said weighted summation of input signals, whereby the effects of said stray capacitances on said weighted summation of said input signals is reduced; and means for applying as programming signals to said $(M+1)^{th}$ through $2M^{th}$ capacitive elements binary numbers that are the one's complements of binary numbers applied as programming signals to said first through $M^{th}$ capacitive elements respectively.

10. A processor as set forth in claim 9 having associated therewith:

a respective binary counter for supplying the programming signal for each of said first through $M^{th}$ capacitive elements, which binary counter is identified by the same ordinal number as the capacitive element it supplies programming signal; and means for controlling the incrementing and decrementing of the binary count in each of said binary counters.

11. A processor as set forth in claim 9 including:

a respective memory array for binary numbers having a respective word storage element for each of said first through $M^{th}$ capacitive elements for supplying the binary number applied to that capacitive element as its programming signal.

12. A plurality, N in number, of processors of the type set forth in claim 11, respectively identified by respective consecutive ordinal numbers first through $N^{th}$, N being a positive integer, said first through $N^{th}$ processors having each set of their input lines that are identified by the same ordinal number connected to be receptive of the same input signal, thereby to provide a neural network layer.

13. A plurality, L in number, of neural net layers respectively identified by consecutive ordinal numbers zeroeth through $(L-1)^{th}$, L being a positive integer, each of said zeroeth through $(L-1)^{th}$ neural net layers comprising a respective plurality, M in number, of processors of the type set forth in claim 11, respectively identified by respective consecutive ordinal numbers first through $M^{th}$, said first through $M^{th}$ processors having each set of their input lines that are identified by the same ordinal number connected to be receptive of the same input signal, the non-linear amplifiers of said first through $M^{th}$ processors in each of said neural net layers after the zeroeth supplying their output signals to determine the input voltage signals identified by corresponding ordinal numbers of respective processors in said neural network layer of next lower numbering.

14. A neural net layer comprising a respective plurality, M in number, of processors of a type as set forth in claim 11, respectively identified by respective consecutive ordinal numbers first through $M^{th}$, said first through $M^{th}$ processors having each set of their input lines that are identified by the same ordinal number connected to be receptive of the same input signal, said neural net layer being of a type for being trained during at least one training period of time, each followed by a respective operating period of time, said neural net layer having
- differentiation means associated with each said processor for determining the slope of non-linear response from its said non-linear amplifier for a predetermined set of said input signal voltage signals;
- means for multiplying the slope of non-linear response for the respective non-linear amplifier of each said processor by an error signal associated with that processor thereby to generate a respective modified error signal associated with each processor;
- means for applying, during said training time, said modified error signal associated with each processor to said output line associated with that said processor;
- means for changing the binary number stored in each said word storage element during each training period by an amount related to the product of (1) the input signal applied to the one of the first through $M^{th}$ input lines identified by the same ordinal number as the one of said capacitive elements receiving its programming signal from that word storage element and (2) the modified error signal applied to the output line to which that one of said capacitive elements connects; and
- a plurality M in number of differential charge-sensing amplifiers being respectively identified by consecutive ordinal numbers first through $M^{th}$, having respective first input ports respectively connected to the input lines identified by the same ordinal number as their own, having respective second input ports respectively connected to the input lines identified by the ordinal number M higher than their own, and having respective output ports responding to the difference of charge flow to their respective said first and second input ports during each said training period of time for generating an error signal identified by the same ordinal number as said processor generating it.

15. A plurality, L in number, of neural net layers of the type set forth in claim 14, respectively identified by consecutive ordinal numbers zeroeth through $(L-1)^{th}$, L being a positive integer, the output ports of the processors in each of said neural net layers other than the zeroeth supplying the output signals from their non-linear amplifiers to determine the input voltage signals of respective processors in neural network layers of next lower ordinal numbering, and in each neural network layer other than the zeroeth, each processor therein being provided with the correspondingly numbered error signal from the neural net with next lower ordinal number.

16. A neural net layer as set forth in claim 14 wherein each said word storage element comprises:
- a respective up/down binary counter having respective first and second count output ports from which the complementary binary numbers stored therein are available, having a respective clock input port connected to receive a repetitive clocking signal, and having a respective up/down control port; and
- a respective exclusive-OR gate being associated with each said up/down binary counter, having an output port connecting to the up/down control port of said up/down binary counter associated therewith, having a first input port receptive of a signal corresponding to the sign of input signal applied in balanced form to the pair of input lines to which connect the capacitive elements receiving their programming signals responsive to the binary numbers stored within said associated up/down counter, and having a second input port receptive of a signal corresponding to the sign of the modified error signal applied to the output line to which connect the capacitive elements receiving their programming signals responsive to the binary numbers stored within said associated up/down counter.

17. A neural net, for responding to a plurality M in number of input signal voltages identified by consecutive ordinal numbers first through $M^{th}$, to generate a plurality N in number of output signal voltages identified by consecutive ordinal numbers first through $N^{th}$, M and N each being a respective positive plural integer, said neural net comprising:
- a plurality 2M in number of input lines respectively identified by consecutive ordinal numbers first through $2M^{th}$;
- a plurality N in number of output lines respectively identified by consecutive ordinal numbers first through $N^{th}$;
- a respective capacitive element for connecting each of said first through $2M^{th}$ input lines to each of certain said output lines;
- a respective input driver amplifier responding to each input signal voltage for applying non-inverted response to that input signal to the one of said first through $M^{th}$ input lines identified by the same ordinal number as that input signal voltage and for applying inverted response to that input signal voltage to the one of said $(M+1)^{th}$ through $2M^{th}$ input lines identified by an ordinal number M above the ordinal number identifying that input signal voltage;
- a respective output driver amplifier responding to the change in charge on each said output line for generating a respective said output signal voltag, each said output driver amplifier having a non-linear voltage versus charge transfer characteristic;

a respective differentiator associated with each output driver amplifier for measuring the slope of its transfer characteristic for a given set of input voltage signals;

means for temporarily storing the measured slopes of the transfer characteristic of each of said output driver amplifiers;

a respective analog multiplier associated with each said output driver amplifier, each said analog multiplier multiplying the temporarily stored measured slope of the transfer characteristic of the one of said output driver amplifiers with which it is associated with a respective input error signal to generate a respective product signal;

means for applying during training periods the product signal of each said analog multiplier to the output line to which its associated output driver amplifier responds to changes in charge on; and means for generating a respective output error signal responsive to the change in charge between each of said first through $M^{th}$ input lines and the one of said $(M+1)^{th}$ and $2M^{th}$ input lines identified by ordinal number M higher.

18. A processor for providing an "axon" response to a plurality of "synapse" input signal voltages, said processor comprising:

a non-linear amplifier, having an input port, and having an output port for supplying said "axon" response responsive to a weighted summation of said input signal voltages being received at its input port, said non-linear amplifier exhibiting a sigmoidal non-linear response characteristic, said sigmoidal response characteristic having a portion of response characteristic with maximum or close-to-maximum sensitivity between portions of response characteristic with substantially-less-than-maximum sensitivity;

a plurality, 2M in number, of input lines respectively identified by consecutive ordinal numbers first through $2M^{th}$, M being a positive integer;

means for applying M "synapse" input signal voltages in balanced form each to a respective pair of said input lines, identified by ordinal numbers M apart;

a plurality, M in number, of bridge configurations, each bridge configuration having respective first and second input terminals to which a respective pair of said input lines respectively connect, having a respective output terminal from which the input port of said non-linear amplifier connects for receiving said weighted summation of said input signal, having a respective reference terminal for receiving a direct potential, having a respective first capacitive element connected between its first input terminal and its output terminal, having a respective second capacitive element connected between its second input terminal and its output terminal, having a respective third capacitive element connected between its first input terminal and its reference terminal, and having a respective fourth capacitive element connected between its second input terminal and its reference terminal, said first and fourth capacitive elements of each bridge configuration having capacitance values that are substantially the same as each other, and said second and third capacitive elements of each bridge configuration having capacitance values that are substantially the same as each other, the capacitance values of the capacitive elements in said bridge configurations determining the relative weightings of said input signals in the weighted summation of said input signal voltages being received at the input port of said non-linear amplifier; and means, included within said means for applying M input signal voltages, for applying said signal voltages in balanced form at levels such as to cause, responsive to certain combinations of said M input signal voltages all within their ordinary ranges, said non-linear amplifier to operate in a portion of its sigmoidal response characteristic having substantially-less-than-maximum sensitivity.

19. A processor as set forth in claim 18 wherein said non-linear amplifier comprises:

dc-restorative means for clamping said output line to a reference voltage at selected times; and a non-linear voltage amplifier having an input port to which said output line connects and having an output port at which said neuron-like response is provided.

20. A processor as set forth in claim 18 wherein said non-linear amplifier comprises:

a charge-sensing amplifier having an input port to which said output line connects and having an output port; and means for providing a non-linear voltage response to voltage appearing at the output port of said charge-sensing amplifier.

21. A processor as set forth in claim 18 wherein each of said capacitive elements is a respective digital capacitor of the same type as each of the others, each said digital capacitor having a capacitance that is programmed by a respective binary number programming signal.

22. A processor as set forth in claim 18 wherein said non-linear amplifier exhibits symmetrical non-linearity about a particular value of its output voltage.

23. A processor as set forth in claim 22 wherein said non-linear amplifier comprises:

dc-restorative means for clamping said output line to a reference voltage at selected times;

a linear amplifier having an input port to which said output line connects and having an output port;

first and second insulated-gate field-effect transistors respectively of first and second conductivity types, which conductivity types are complementary respective to each other, each of said first and second transistors having a respective gate electrode and a respective source electrode and a respective drain electrode, the gate electrode of said first transistor connected from the output port of said linear amplifier, the gate electrode of said second transistor connected from the source electrode of said first transistor, and the source electrode of said second transistor supplying the output voltage of said non-linear amplifier;

means for connecting said first transistor to operate as a source follower that saturates responsive to the weighted summation of said input signal voltages appearing on said output line exhibiting an excursion of a first polarity sense beyond a prescribed absolute value; and means for connecting said second transistor to operate as a source follower that saturates responsive to the weighted summation of said input signal voltages appearing on said output line exhibiting an excursion of a second polarity sense beyond a prescribed absolute value, said first and second senses of polarity being opposite to each other.

24. A processor as set forth in claim 23 wherein said linear amplifier comprises:
a charge-sensing amplifier having an input port to which said output line connects and having an output port from which the gate electrode of said first transistor is connected.

25. A plurality, N in number, of processors of the type set forth in claim 18, respectively identified by respective consecutive ordinal numbers first through $N^{th}$, N being a positive integer, said first through $N^{th}$ processors having each set of their input lines that are identified by the same ordinal number connected to be receptive of the same input signal, thereby to provide a neural network layer.

26. A neural net layer, as set forth in claim 25, suitable for inclusion as a preceding, hidden neural net layer with a succeeding neural net layer in a neural network that can be trained during at least one training period of time each followed by a respective operating period of time, for supplying its output signal voltages as input signal voltages to said succeeding neural net layer during each said operating period of time, and for receiving output error signals from said succeeding neural net layer as input error signals thereto during each said training period of time; said neural net layer suitable for inclusion as a preceding, hidden neural net layer including:
means for applying during each said training period respective signals to said first through $N^{th}$ output lines, which respective signals are proportional to said input error signals received by said neural net layer; and
means for generating during each said training period a respective output error signal responsive to the change in charge between each of said first through $M^{th}$ input lines and the one of said $(M+1)^{th}$ and $2M^{th}$ input lines identified by ordinal number M higher.

27. A plurality, L in number, of neural net layers of the type set forth in claim 25, respectively identified by consecutive ordinal numbers zeroeth through $(L-1)^{th}$, L being a positive integer, the non-linear amplifiers of the processors in each of said neural net layers after the zeroeth supplying their output signals to determine the input signal voltages of respective processors in neural net layers of lower ordinal numbering.

28. A plurality of connected neural network layers as set forth in claim 27 wherein the values of M and of N are the same within each neural net layer and for all of the neural layers.

29. A processor for providing an "axon" response to a plurality of "synapse" input signal voltages, said processor comprising:
a non-linear amplifier having an input port and having an output port at which said "axon" response is provided responsive to a weighted summation of said input signal voltages being received at its input port;
a plurality, 2M in number, of input lines respectively identified by consecutive ordinal numbers first through $2M^{th}$, M being a positive integer;
means for applying M "synapse" input signal voltages in balanced form each to a respective pair of said input lines, identified by ordinal numbers M apart;
a plurality, M in number, of bridge configurations, each bridge configuration having respective first and second input terminals to which a respective pair of said input lines respectively connect, having a respective output terminal from which the input port of said non-linear amplifier connects for receiving said weighted summation of said input signal, having a respective reference terminal for receiving a direct potential, having a respective first capacitive element connected between its first input terminal and its output terminal, having a respective second capacitive element connected between its second input terminal and its output terminal, having a respective third capacitive element connected between its first input terminal and its reference terminal, and having a respective fourth capacitive element connected between its second input terminal and its reference terminal, each of said capacitive elements being a respective digital capacitor having a capacitance that is programmed by a respective binary number programming signal;
a respective binary counter associated with each bridge configuration for supplying the programming signals for each of its respective first, second, third and fourth capacitive elements, said first and fourth capacitive elements of each bridge configuration being supplied similar programming signals conditioning them to exhibit capacitance values that are substantially the same as each other, and said second and third capacitive elements of each bridge configuration being supplied similar programming signals conditioning them to exhibit capacitance values that are substantially the same as each other; and
means for controlling the incrementing and decrementing of the binary count in each of said binary counters.

30. A processor for providing an "axon" response to a plurality of "synapse" input signal voltages, said processor comprising:
a non-linear amplifier having an input port and having an output port for providing a non-linear response corresponding to said "axon" response responsive to a weighted summation of said input signal voltages being received at its input port;
a plurality, 2M in number, of input lines respectively identified by consecutive ordinal numbers first through $2M^{th}$, M being a positive integer;
means for applying M "synapse" input signal voltages in balanced form each to a respective pair of said input lines, identified by ordinal numbers M apart;
a plurality, M in number, of bridge configurations, each bridge configuration having respective first and second input terminals to which a respective pair of said input lines respectively connect, having a respective output terminal from which the input port of said non-linear amplifier connects for receiving said weighted summation of said input signal, having a respective reference terminal for receiving a direct potential, having a respective first capacitive element connected between its first input terminal and its output terminal, having a respective second capacitive element connected between its second input terminal and its output terminal, having a respective thrid capacitive element connected between its first input terminal and its reference terminal, and having a respective fourth capacitive element connected between its second input terminal and its reference terminal, each of said capacitive elements being a respective digital capacitor having a structure equivalent to the structure of the others and having a capacitance that is programmed by a respective binary number programming signal, the capacitance values of the capacitive elements in said bridge configurations determining the relative weightings of said input signals in the weighted summation of said input signal voltages being received at the input port of said non-linear amplifier; and a respective memory array for binary numbers having a respective word storage element for each of said bridge configurations for supplying the binary numbers applied to the capactive elements of those bridge configurations as their programming signals said first and fourth capacitive elements of each bridge configuration being supplied similar programming signals conditioning them to exhibit capacitance values that are substantially the same as each other, and said second and third capacitive elements of each bridge configuration being supplied similar programming signals conditioning them to exhibit capacitance values that are substantially the same as each other.

31. A plurality, N in number, of processors of the type set forth in claim 30, respectively identified by respective consecutive ordinal numbers first through $N^{th}$, N being a positive integer, said first through $N^{th}$ processors having each set of their input lines that are identified by the same ordinal number connected to be receptive of the same input signal, thereby to provide a neural network layer.

32. A plurality, L in number, of neural net layers of the type set forth in claim 31, respectively identified by consecutive ordinal numbers zeroeth through $(L-1)^{th}$, L being a positive integer, the non-linear amplifiers of the processors in each of said neural net layers after the zeroeth supplying their output signals to determine the input voltage signals of respective processors in neural network layers of lower numbering.

33. A neural net layer comprising a respective plurality, M in number, of processors of a type as set forth in claim 30, respectively identified by respective consecutive ordinal numbers first through $M^{th}$, said first through $M^{th}$ processors having each set of their input lines that are identified by the same ordinal number connected to be receptive of the same input signal, said neural net layer being of a type for being trained during at least one training period of time, each followed by a respective operating period of time, said neural net layer having differentiation means associated with each said processor for determining the slope of non-linear response from its said non-linear amplifier for a predetermined set of said input signal voltage signals;

means for multiplying the slope of non-linear response for the respective non-linear amplifier of each said processor by an error signal associated with that processor thereby to generate a respective modified error signal associated with each processor;

means for applying, during said training time, said modified error signal associated with each processor to said output line associated with that said processor;

means for changing the binary number stored in each said word storage element during each training period by an amount related to the product of (1) the input signal applied to the one of the first through $M^{th}$ input lines identified by the same ordinal number as the one of said capacitive elements receiving its programming signal from that word storage element and (2) the modified error signal applied to the output line to which that one of said capacitive elements connects; and a plurality M in number of differential charge-sensing amplifiers being respectively identified by consecutive ordinal numbers first through $M^{th}$, having respective first input ports respectively connected to the input lines identified by the same ordinal number as their own, having respective second input ports respectively connected to the input lines identified by the ordinal number M higher than their own, and having respective output ports responding to the difference of charge flow to their respective said first and second input ports during each said training period of time for generating an error signal identified by the same ordinal number as said processor generating it.

34. A plurality, L in number, of neural net layers of the type set forth in claim 33, respectively identified by consecutive ordinal numbers zeroeth through $(L-1)^{th}$, L being a positive integer, the output ports of the processors in each of said neural net layers other than the zeroeth supplying the output signals from their non-linear amplifiers to determine the input voltage signals of respective processors in neural network layers of next lower ordinal numbering, and in each neural network layer other than the zeroeth, each processor therein being provided with the correspondingly numbered error signal from the neural net with next lower ordinal number.

35. A neural net layer as set forth in claim 33 having wherein each said word storage element comprises:

a respective up/down binary counter having respective first and second count output ports from which the complementary binary numbers stored therein are available, having a respective clock input port connected to receive a repetitive clocking signal, and having a respective up/down control port; and a respective exclusive-OR gate being associated with each said up/down binary counter, having an output port connecting to the up/down control port of said up/down binary counter associated therewith, having a first input port receptive of a signal corresponding to the sign of input signal applied in balanced form to the pair of input lines to which connect the capacitive elements receiving their programming signals responsive to the binary numbers stored within said associated up/down counter, and having a second input port receptive of a signal corresponding to the sign of the modified error signal applied to the output line to which connect the capacitive elements receiving their programming signals responsive to the binary numbers stored within said respective up/down counter.

36. A processor for providing an "axon" response to a plurality of "synapse" input signal voltages, said processor comprising:

an output line on which a weighted summation of said input signal voltages appears;

a plurality, 2M in number, of input lines respectively identified by consecutive ordinal numbers first through $2M^{th}$, M being a positive integer;

a plurality, 2M in number, of capacitive elements, each exhibiting a respective capacitance including at least a respective stray capacitance component, each said capacitive element connecting a respective one of said input lines to said output line, and being identified by the same ordinal number as the input line it connects to said output line;

means for applying M input signal voltages in balanced form each to a respective pair of said input lines, identified by ordinal numbers M apart, the difference in the capacitances of the capacitive elements connecting to said output line from said pair of input lines determining the weighting of the input signal applied in balanced form on that said pair of input lines, as appears in said weighted summation of input signals, whereby the effects of said stray capacitances on said weighted summation of said input signals is reduced;

dc-restorative means for clamping said output line to a reference voltage at selected times;

a linear amplifier having an input port to which said output line connects and having an output port;

first and second insulated-gate field-effect transistors respectively of first and second conductivity types, which conductivity types are complementary respective to each other, each of said first and second transistors having a respective gate electrode and a respective source electrode and a respective drain electrode, the gate electrode of said first transistor connected from the output port of said linear amplifier, the gate electrode of said second transistor connected from the source electrode of said first transistor, and the source electrode of said second transistor arranged for supplying said "axon" response;

means for connecting said first transistor to operate as a source follower that saturates responsive to the weighted summation of said input signal voltages appearing on said output line exhibiting an excursion of a first polarity sense beyond a prescribed absolute value; and means for connecting said second transistor to operate as a source follower that saturates responsive to the weighted summation of said input signal voltages appearing on said output line exhibiting an excursion of a second polarity sense beyond a prescribed absolute value, said first and second senses of polarity being opposite to each other.

37. A processor as set forth in claim 36 wherein said linear amplifier comprises:

a charge-sensing amplifier having an input port to which said output line connects and having an output port from which the gate electrode of said first transistor is connected.

38. A processor for providing in response to a plurality of input signal voltages a weighted summation of said input signal voltages, said processor comprising:

an output line on which said weighted summation of said input signal voltages appears;

a plurality, 2M in number, of input lines respectively identified by consecutive ordinal numbers first through $2M^{th}$, M being a positive integer;

a plurality, 2M in number, of digital capacitors, each exhibiting a respective desired capacitance of a value determined by a respective binary programming signal, which respective desired capacitance is accompanied by a respective undesired stray capacitance, each said digital capacitor connecting a respective one of said input lines to said output line, and being identified by the same ordinal number as the input line it connects to said output line;

means for applying M input signal voltages in balanced form each to a respective pair of said input lines, identified by ordinal numbers M apart, the difference in the capacitances of the digital capacitors connecting to said output line from said pair of input lines determining the weighting of the input signal applied in balanced form on that said pair of input lines, as appears in said weighted summation of input signals, whereby the effects of said stray capacitances on said weighted summation of said input signals is reduced;

a memory array for binary numbers having a plurality of word storage elements respectively identified by consecutive ordinal numbers first through $M^{th}$, each said word storage element temporarily storing the binary programming signals for said digital capacitors identified by the same ordinal number and by the ordinal number M higher; and means for serially re-writing the contents of said plurality of word storage elements.

39. A processor as set forth in claim 38 wherein at least said plurality of digital capacitors and said memory array for binary numbers are located within the confines of a monolithic integrated circuit, wherein said word storage elements are located interstitially among an array of the digital capacitors they respectively supply binary programming signals.

40. Within the confines of a monolithic integrated circuit, a plurality N in number of processors identified by respective ones of the consecutive ordinal numbers first through $N^{th}$, each of said first through $N^{th}$ processors for providing in response to a plurality of input signal voltages M in number a respective weighted summation of said input signal voltages, each of said first through $N^{th}$ processors comprising:

a respective output line identified by the same ordinal number as said processor on which a respective one of said weighted summations of said input signal voltages appears;

a plurality, 2M in number, of input lines respectively identified by consecutive ordinal numbers first through $2M^{th}$, M being a positive integer, and shared with the others of said plurality N in number of processors; and a respective plurality, 2M in number, of digital capacitors, each exhibiting a respective desired capacitance of a value determined by a respective binary programming signal, each said digital capacitor connecting a respective one of said input lines to said output line via its desired capacitance, and being identified by the same ordinal number as the input line it connects to said output line—said plurality N in number of processors being connected in a combination together with:

means for applying M input signal voltages in balanced form each to a respective pair of said input lines, identified by ordinal numbers M apart; and a memory array for binary numbers having N pluralities of M word storage elements within the confines of said monolithic integrated circuit, said N pluralities of word storage elements being identified by respective ones of the consecutive ordinal numbers first through $N^{th}$, the M word storage elements in each of said first through $N^{th}$ pluralities of word storage elements being respectively identified by consecutive ordinal numbers first through $M^{th}$, each said word storage element temporarily storing the binary programming signals for said digital capacitors identified by the same ordinal number and by the ordinal number M higher within the one of said first through $N^{th}$ processors identified by the same ordinal number as the plurality of word storage elements that word storage element is included within; and means for serially re-writing the contents of each said word storage element in said first through $N^{th}$ pluralities of word storage elements.

41. A combination as set forth in claim 40 wherein said means for serially re-writing the contents of said first through $N^{th}$ pluralities of word storage elements is of a type including:

means for addressing a serially selected one of said word storage elements with a first partial address and with a second partial address, said first partial address indicating in which selected one of said first through $N^{th}$ pluralities of word storage elements said serially selected word storage element is included, and said second partial address indicating which of the first through $M^{th}$ word storage elements in said selected one of said first through $N^{th}$ pluralities of word storage elements is said serially selected word storage element.

42. A processor for providing in response to a plurality of input signal voltages a weighted summation of said input signal voltages, said processor comprising:

an output line on which said weighted summation of said input signal voltages appears;

a plurality, 2M in number, of input lines respectively identified by consecutive ordinal numbers first through $2M^{th}$, M being a positive integer;

a plurality, 2M in number, of digital capacitors, each exhibiting a respective desired capacitance of a value determined by a respective binary programming signal, which respective desired capacitance is accompanied by a respective undesired stray capacitance, each said digital capacitor connecting a respective one of said input lines to said output line, and being identified by the same ordinal number as the input line it connects to said output line;

means for applying M input signal voltages in balanced form each to a respective pair of said input lines, identified by ordinal numbers M apart, the difference in the capacitances of the digital capacitors connecting to said output line from said pair of input lines determining the weighting of the input signal applied in balanced form on that said pair of input lines, as appears in said weighted summation of input signals, whereby the effects of said stray capacitances on said weighted summation of said input signals is reduced;

a plurality of binary counters M in number identified by respective ones of the ordinal numbers first through $M^{th}$, each of said first through $M^{th}$ binary counters connected for supplying the programming signal for said digital capacitors identified by the corresponding ordinal number and the ordinal number higher by M; and means for controlling the incrementing and decrementing of the binary count in each of said binary counters.

43. A processor as set forth in claim 42 wherein at least said plurality of digital capacitors and said plurality of binary counters are located within the confines of a monolithic integrated circuit, wherein said binary counters are located interstitially among an array of the digital capacitors they respectively supply binary programming signals.

44. Within the confines of a monolithic integrated circuit, a plurality N in number of processors identified by respective ones of the consecutive ordinal numbers first through $N^{th}$, each of said first through $N^{th}$ processors for providing in response to a plurality of input signal voltages M in number a respective weighted summation of said input signal voltages, each of said first through $N^{th}$ processors comprising:

a respective output line identified by the same ordinal number as said processor on which a respective one of said weighted summations of said input signal voltages appears;

a plurality, 2M in number, of input lines respectively identified by consecutive ordinal numbers first through $2M^{th}$, M being a positive integer, and shared with the others of said plurality N in number of processors; and a respective plurality, 2M in number, of digital capacitors, each exhibiting a respective desired capacitance of a value determined by a respective binary programming signal, each said digital capacitor connecting a respective one of said input lines to said output line via its desired capacitance, and being identified by the same ordinal number as the input line it connects to said output line—said plurality N in number of processors being connected in a combination together with:

means for applying M input signal voltages in balanced form each to a respective pair of said input lines, identified by ordinal numbers M apart; and N pluralities of M respective binary counters within the confines of said monolithic integrated circuit, the respective binary counters in each plurality being identified by respective ones of the ordinal numbers first through $M^{th}$, each of said first through $M^{th}$ binary counters connected for supplying the programming signal for said digital capacitors identified by the corresponding ordinal number and the ordinal number higher by M within the one of said first through $N^{th}$ processors identified by the same ordinal number as the plurality of binary counters that binary counter is included within; and means for controlling the incrementing and decrementing of the binary count in each of said binary counters.

45. A processor for providing in response to a plurality M in number of input signal voltages a weighted summation of said input signal voltages, said processor comprising:

a differential-input amplifer having an input port and having an output port for supplying said weighted summation of said input signal voltages;

a plurality, 2M in number, of input lines respectively identified by consecutive ordinal numbers first through $2M^{th}$, M being a positive integer:

means for applying said input signal voltages in balanced form each to a respective pair of said input lines, identified by ordinal numbers M apart;

a plurality, M in number, of bridge configurations, each bridge configuration having respective first and second input terminals to which a respective pair of said input lines respectively connect, having a respective output terminal from which the input port of said differential-input amplifier connects, having a respective reference terminal for receiving a direct potential, having a respective first digital capacitor connected between its first input terminal and its output terminal, having a respective second digital capacitor connected between its second input terminal and its output terminal, having a respective third digital capacitor connected between its first input terminal and its reference terminal, and having a respective fourth digital capacitor connected between its second input terminal and its reference terminal, said first and fourth digital capacitors of each bridge configuration exhibiting desired capacitance values that are substantially the same as each other as determined by a respective binary programming signal, said second and third digital capacitors of each bridge configuration exhibiting desired capacitance values that are substantially the same as each other as determined by a respective binary programming signal, and the capacitance values of the capacitive elements in said bridge configurations determining the relative weightings of said input signals in the weighted summation of said input signal voltages being received at the input port of said non-linear amplifier; and a respective memory array for binary numbers having a respective word storage element for temporarily storing the binary programming signals for the first, second, third and fourth digital capacitors of each of said bridge configurations.

46. A processor as set forth in claim 45 wherein at least said plurality of bridge configurations and said memory array for binary numbers are located within the confines of a monolithic integrated circuit, wherein said word storage elements are located interstitially among an array of the bridge configurations they respectively supply binary programming signals.

47. Within the confines of a monolithic integrated circuit, a plurality N in number of processors identified by respective ones of the consecutive ordinal numbers first through $N^{th}$, each of said first through $N^{th}$ processors for providing in response to a plurality of input signal voltages M in number a respective weighted summation of said input signal voltages, each of said first through $N^{th}$ processors comprising:

a respective differential-input amplifier having an input port and having an output port for supplying said weighted summation of said input signal voltages;

a plurality, 2M in number, of input lines respectively identified by consecutive ordinal numbers first through $2M^{th}$, M being a positive integer, and shared with the others of said plurality N in number of processors; and a plurality, M in number, of bridge configurations, each bridge configuration having respective first and second input terminals to which a respective pair of said input lines respectively connect, having a respective output terminal from which the input port of said differential-input amplifier connects, having a respective reference terminal for receiving a direct potential, having a respective first digital capacitor connected between its first input terminal and its output terminal, having a respective second digital capacitor connected between its second input terminal and its output terminal, having a respective third digital capacitor connected between its first input terminal and its reference terminal, and having a respective fourth digital capacitor connected between its second input terminal and its reference terminal, said first and fourth digital capacitors of each bridge configuration exhibiting desired capacitance values that are substantially the same as each other as determined by a respective binary programming signal, and said second and third digital capacitors of each bridge configuration exhibiting desired capacitance values that are substantially the same as each other as determined by a respective binary programming signal; and—said plurality N in number of processors being connected in a combination together with:

means for applying M input signal voltages in balanced form each to a respective pair of said input lines, identified by ordinal numbers M apart; and a memory array for binary numbers having N pluralities of M word storage elements within the confines of said monolithic integrated circuit, said N pluralities of word storage elements being identified by respective ones of the consecutive ordinal numbers first through $N^{th}$, the M word storage elements in each of said first through $N^{th}$ pluralities of word storage elements being respectively identified by connective ordinal numbers first through $M^{th}$, each said word storage element temporarily storing the binary programming signals for said bridge configurations identified by the same ordinal number within the one of said first through $N^{th}$ processors identified by the same ordinal number as the plurality of word storage elements that word storage element is included within; and means for serially re-writing the contents of each said word storage element in said first through $N^{th}$ pluralities of word storage elements.

48. A combination as set forth in claim 47 wherein said means for serially re-writing the contents of said first through $N^{th}$ pluralities of word storage elements is of a type including:

means for addressing a serially selected one of said word storage elements with a first partial address and with a second partial address, said first partial address indicating in which selected one of said first through $N^{th}$ pluralities of word storage elements said serially selected word storage element is included, and said second partial address indicating which of the first through $M^{th}$ word storage elements in said selected one of said first through $N^{th}$ pluralities of word storage elements is said serially selected word storage element.

49. A processor for providing in response to a plurality M in number of input signal voltages a weighted summation of said input signal voltages, said processor comprising:

a differential-input amplifier having an input port and having an output port for supplying said weighted summation of said input signal voltages;

a plurality, 2M in number, of input lines respectively identified by consecutive ordinal numbers first through $2M^{th}$, M being a positive integer:

means for applying said input signal voltages in balanced form each to a respective pair of said input lines, identified by ordinal numbers M apart;

a plurality, M in number, of bridge configurations, each bridge configuration having respective first and second input terminals to which a respective pair of said input lines respectively connect, having a respective output terminal from which the input port of said differential-input amplifier connects, having a respective reference terminal for receiving a direct potential, having a respective first digital capacitor connected between its first input terminal and its output terminal, having a respective second digital capacitor connected between its second input terminal and its output terminal, having a respective third digital capacitor connected between its first input terminal and its reference terminal, and having a respective fourth digital capacitor connected between its second input terminal and its reference terminal, said first and fourth digital capacitors of each bridge configuration exhibiting desired capacitance values that are substantially the same as each other as determined by a respective binary programming signal, and said second and third digital capacitors of each bridge configuration exhibiting desired capacitance values that are substantially the same as each other as determined by a respective binary programming signal;

a plurality of binary counters M in number identified by respective ones of the ordinal numbers first through $M^{th}$, each of the said first through $M^{th}$ binary counters connected for supplying the binary programming signals for the first, second, third and fourth digital capacitors of said bridge configuration identified by the corresponding ordinal number; and means for controlling the incrementing and decrementing of the binary count in each of said binary counters.

50. A processor as set forth in claim 49 wherein at least said plurality of bridge configurations and said plurality of binary counters are located within the confines of a monolithic integrated circuit, wherein said binary counters are located interstitially among an array of the bridge configurations they respectively supply binary programming signals.

51. Within the confines of a monolithic integrated circuit, a plurality N in number of processors identified by respective ones of the consecutive ordinal numbers first through $N^{th}$, each of said first through $N^{th}$ processors for providing in response to a plurality of input signal voltages M in number a respective weighted summation of said input signal voltages, each of said first through $N^{th}$ processors comprising:

a respective differential-input amplifier having an input port and having an output port for supplying said weighted summation of said input signal voltages;

a plurality, 2M in number, of input lines respectively identified by consecutive ordinal numbers first through $2M^{th}$, M being a positive integer, and shared with the others of said plurality N in number of processors; and a plurality, M in number, of bridge configurations, each bridge configuration having respective first and second input terminals to which a respective pair of said input lines respectively connect, having a respective output terminal from which the input port of said differential-input amplifier connects, having a respective reference terminal for receiving a direct potential, having a respective first digital capacitor connected between its first input terminal and its output terminal, having a respective second digital capacitor connected between its second input terminal and its output terminal, having a respective third digital capacitor connected between its first input terminal and its reference terminal, and having a respective fourth digital capacitor connected between its second input terminal and its reference terminal, said first and fourth digital capacitors of each bridge configuration exhibiting desired capacitance values that are substantially the same as each other as determined by a respective binary programming signal, and said second and third digital capacitors of each bridge configuration exhibiting desired capacitance values that are substantially the same as each other as determined by a respective binary programming signal; and—said plurality N in number of processors being connected in a combination together with:

means for applying M input signal voltages in balanced form each to a respective pair of said input lines, identified by ordinal numbers M apart;

N pluralities of M respective binary counters within the confines of said monolithic integrated circuit, the respective binary counters in each plurality being identified by respective ones of the ordinal numbers first through $M^{th}$, each of said first through $M^{th}$ binary counters connected for supplying the programming signal for the first, second, third and fourth digital capacitors in said bridge configuration identified by the corresponding ordinal number and the ordinal number higher by M within the one of said first through $N^{th}$ processors identified by the same ordinal number as the plurality of binary counters that binary counter is included within; and means for controlling the incrementing and decrementing of the binary count in each of said binary counters.

52. A processor for a plurality of input signal voltages, said processor comprising:

an output line on which a weighted summation of said input signal voltages appears;

a plurality, 2M in number, of input lines respectively identified by connective ordinal numbers first through $2M^{th}$, M being a positive integer:

a plurality, 2M in number, of capacitive elements, each said capacitive element connecting a respective one of said input lines to said output line, and being identified by the same ordinal number as the input line it connects to said output line, each of said capacitive elments being a respective digital capacitor having a structure equivalent to the structure of each of the others and exhibiting a respective capacitance that is programmed by a respective binary number programming signal and that is altered responsive to a change in said respective binary number programming signal; and means for applying M input signal voltages in balanced form each to a respective pair of said input lines, identified by ordinal numbers M apart, the difference in the capacitances of the capacitive elements connecting to said output line from said pair of input lines determining the weighting of the input signal applied in balanced form on that said pair of input lines, as appears in said weighted summation of input signals.

53. A processor as set forth in claim 52 including:

a non-linear amplifier having an input port to which said output line connects and having an output port at which an output response is provided, said nonlinear amplifier exhibiting a sigmoidal non-linear response characteristic, said sigmoidal response characteristic having a portion of response characteristic with maximum or close-to-maximum sensitivity between portions of response characteristic with substantially-less-than-maximum sensitivity; and means, included within said means for applying M input signal voltages in balanced form each to a respective pair of said input lines, for applying said signal voltages in balanced form at levels such as to cause, responsive to certain combinations of said M input signal voltages all within their ordinary ranges, said non-linear amplifier to operate at times in a portion of its sigmoidal response characteristic having substantially-less-than-maximum sensitivity.

54. A processor as set forth in claim 52 including:
an amplifier having an input port to which said output line connects and having an output port at which an output response is provided;
means for referring said output line to a reference voltage during dc-restoration periods interspersed among times of normal operation;
means for applying voltages associated with zero-valued first through $M^{th}$ input signal voltages to said first through $M^{th}$ input lines during said dc-restoration periods; and
means for applying voltages associated with zero-valued first through $M^{th}$ input signal voltages to said $(M+1)^{th}$ through $2M^{th}$ input lines during said dc-restoration periods.

55. A plurality, L in number, of neural net layers respectively identified by consecutive ordinal numbers zeroeth through $(L-1)^{th}$, L being a positive integer at least two, each said neural net layer including:
a respective plurality, 2M in number, of input lines respectively identified by consecutive ordinal numbers first through $2M^{th}$, the respective M for each neural net layer being a positive integer at least two;
means for applying voltages associated with zero-valued first through $M^{th}$ input signal voltages to said first through $M^{th}$ input lines during dc-restoration periods interspersed among times of normal operation;
means for applying voltages associated with zero-valued first through $M^{th}$ input signal voltages to said $(M+1)^{th}$ through $2M^{th}$ input lines during said dc-restoration periods;
means for applying M input signal voltages in balanced form each to a respective pair of said input lines, identified by ordinal numbers M apart, so that said input lines in each respective pair simultaneously differ from the respective voltages applied to them during said dc-restoration periods by voltages of the same amplitude and opposite polarity; and
a respective plurality, N in number, of processors respectively identified by respective consecutive ordinal numbers first through $N^{th}$, the respective N for each neural net layer being a positive integer at least two, each said processor comprising:
a respective output line on which a weighted summation of said input signal voltages appears;
means for referring said respective output line to a reference voltage during said dc-restoration periods;
a respective amplifier having an input port to which said output line connects and having an output port at which a respective output signal is provided, the amplifiers of the processors in each of said neural net layers after the zeroeth supplying their output signals to determine the input signal voltages of respective processors in neural net layers of lower ordinal numbering; and
a plurality, 2N in number, of capacitive elements, each exhibiting a respective capacitance including at least a respective stray capacitance component, each said capacitive element connecting to said output line a respective one of said input lines of that said neural net layer as includes that said processor, and being identified by the same ordinal number as the input line it connects to said respective output line, the difference in the capacitances of the capacitive elements connecting to said output line from each said pair of input lines determining the weighting of the input signal applied in balanced form on that said pair of input lines as appears on said output line.

56. A processor for providing an output response to a plurality of input signal voltages, said processor comprising:
an output line on which a weighted summation of said input signal voltages appears;
an amplifier having an input port to which said output line connects and having an output port at which said output response is provided;
a plurality, 2M in number, of input lines respectively identified by consecutive ordinal numbers first through $2M^{th}$, M being a positive integer;
a plurality, M in number, of bridge configurations, each bridge configuration having respective first and second input terminals to which a respective pair of said input lines respectively connect, having a respective output terminal from which the input port of said non-linear amplifier connects for receiving said weighted summation of said input signal, having a respective reference terminal for receiving a direct potential, having a respective first capacitive element connected between its first input terminal and its output terminal, having a respective second capacitive element connected between its second input terminal and its output terminal, having a respective third capacitive element connected between its first input terminal and its reference terminal, and having a respective fourth capacitive element connected between its second input terminal and its reference terminal, said first and fourth capacitive elements of each bridge configuration having capacitance values that are substantially the same as each other, and said second and third capacitive elements of each bridge configuration having capacitance values that are substantially the same as each other, the capacitance values of the capacitive elements in said bridge configurations determining the relative weightings of said input signals in the weighted summation of said input signal voltages being received at the input port of said nonlinear amplifier;
means for referring said output line to a reference voltage during dc-restoration periods interspersed among times of normal operation;

means for applying voltages associated with zero-valued first through $M^{th}$ input signal voltages to said first through $M^{th}$ input lines during said dc-restoration periods;

means for applying voltages associated with zero-valued first through $M^{th}$ input signal voltages to said $(M+1)^{th}$ through $2M^{th}$ input lines during said dc-restoration periods; and means for applying M input signal voltages in balanced form each to a respective pair of said input lines, identified by ordinal numbers M apart, so that said input lines in each respective pair simultaneously differ from the respective voltages applied to them during said dc-restoration periods by voltages of the same amplitude and opposite polarity during said times of normal operation.

57. A processor as set forth in claim 56 wherein said amplifier is of a type that includes a charge-sensing amplifier for sensing the charge appearing on said output line during said times of normal operation, which said charge-sensing amplifier includes:

a differential-input amplifier having an output terminal, having an inverting input terminal to which said output line connects, and having a non-inverting input terminal to which said reference voltage is applied;

an integrating capacitive element having a first plate connected to the inverting input terminal of said differential-input amplifier and having a second plate;

means for connecting the output terminal of said differential-input amplifier to the second plate of said integrating capacitive element during said times of normal operation;

means for applying said reference voltage to the second plate of said integrating capacitive element during portions of said dc-restoration periods; and means for establishing a conductive path from the output terminal of said differential-input amplifier to the inverting input terminal of said differential-input amplifier during portions of said dc-restoration periods when said reference voltage is applied to the second plate of said integrating capacitive element.

* * * * *